United States Patent
Wang et al.

(10) Patent No.: US 9,575,268 B2
(45) Date of Patent: Feb. 21, 2017

(54) PLUGGABLE CONNECTOR

(71) Applicant: FINISAR CORPORATION, Sunnyvale, CA (US)

(72) Inventors: William H. Wang, Pleasanton, CA (US); Joshua John Edward Moore, Ontario (CA); Shyue-Yang Wang, Sunnyvale, CA (US)

(73) Assignee: FINISAR CORPORATION, Sunnyvale, CA (US)

( * ) Notice: Subject to any disclaimer, the term of this patent is extended or adjusted under 35 U.S.C. 154(b) by 0 days.

(21) Appl. No.: 15/070,893

(22) Filed: Mar. 15, 2016

(65) Prior Publication Data
US 2016/0195685 A1 Jul. 7, 2016

Related U.S. Application Data

(63) Continuation of application No. 14/741,289, filed on Jun. 16, 2015.

(60) Provisional application No. 62/012,953, filed on Jun. 16, 2014.

(51) Int. Cl.
*G02B 6/36* (2006.01)
*G02B 6/42* (2006.01)
*G02B 6/38* (2006.01)

(52) U.S. Cl.
CPC ............. *G02B 6/4292* (2013.01); *G02B 6/387* (2013.01); *G02B 6/3874* (2013.01); *G02B 6/3885* (2013.01); *G02B 6/3887* (2013.01); *G02B 6/3893* (2013.01); *G02B 6/4261* (2013.01); *G02B 6/4214* (2013.01); *G02B 6/4249* (2013.01); *G02B 6/4257* (2013.01)

(58) Field of Classification Search
CPC ... G02B 6/4292; G02B 6/3825; G02B 6/3893; G02B 6/3869; G02B 6/387; G02B 6/4261; G02B 6/3897
USPC .......................... 385/60, 63, 65, 81, 87, 92
See application file for complete search history.

(56) References Cited

U.S. PATENT DOCUMENTS

| | | | |
|---|---|---|---|
| 5,109,453 A | 4/1992 | Edwards et al. | |
| 5,579,425 A * | 11/1996 | Lampert | G02B 6/3869 385/55 |
| 6,454,464 B1 * | 9/2002 | Nolan | G02B 6/3807 385/60 |
| 6,485,189 B1 * | 11/2002 | Gilliland | G02B 6/3878 385/59 |

FOREIGN PATENT DOCUMENTS

| | | |
|---|---|---|
| EP | 1321788 A1 | 6/2003 |
| WO | 2013/186587 A1 | 12/2013 |

OTHER PUBLICATIONS

International Search Report and Written Opinion mailed Aug. 19, 2015 in related PCT Application No. PCT/US2015/036081 (9 pages).

* cited by examiner

*Primary Examiner* — Kaveh C Kianni
*Assistant Examiner* — Hung Lam
(74) *Attorney, Agent, or Firm* — Maschoff Brennan

(57) ABSTRACT

In an embodiment, a pluggable connector configured to removably couple an end of an optical cable to an optoelectronic module includes a first portion and a second portion. The first portion is configured to engage a latch slot of the optoelectronic module to retain within the optoelectronic module a ferrule optically coupled to optical fibers of the optical cable. The second portion is configured to engage the ferrule to prevent removal of the ferrule from within the optoelectronic module when the first portion engages the latch slot.

14 Claims, 17 Drawing Sheets

PLUGGABLE CONNECTOR

CROSS-REFERENCE TO RELATED APPLICATIONS

This application is a continuation of U.S. patent application Ser. No. 14/741,289, filed Jun. 16, 2015, entitled PLUGGABLE CONNECTOR, which claims the benefit of and priority to U.S. Provisional Application No. 62/012,953, filed Jun. 16, 2014, entitled PLUGGLE CABLE CONNECTOR FOR USE WITH AN OPTOELECTRONIC MODULE, which is incorporated herein by reference.

FIELD

Some embodiments described herein relate to cable connectors that may be used with optoelectronic modules.

BACKGROUND

Some data transmission involves the conversion of optical signals to electrical signals and/or electrical signals to optical signals. In some applications, the conversion occurs at a circuit board. For example, an optical cable carrying one or more optical signals may interface with an optoelectronic module such as a board-mounted optical assembly (BOA) such as an optical engine, or a pluggable optoelectronic module such as an XFP, a QSFP, an SFP+, or other pluggable optoelectronic module. At the BOA, the optical signals may be transduced from optical signals to electrical signals using optical receivers. The electrical signals may then be communicated along etched copper traces integrated into the circuit board to a destination. Likewise, electrical signals may be communicated along etched copper traces to the BOA. At the BOA, the electrical signals may be transduced to optical signals by optical transmitters. The optical signals may then be further communicated along the same or a different optical cable that interfaces with the optoelectronic module.

In some BOAs, a lens assembly may be configured to receive an optical interface such as a cable connector. The optical interface generally supports one or more optical fibers that communicate the optical data to and from the BOA. One difficulty with many such cable connectors, however, is that they lack the ability to be easily attached and removed in order to facilitate modular level testing of the BOA.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some example embodiments described herein generally relate to cable connectors that may be used with optoelectronic modules.

In an example embodiment, a pluggable connector configured to removably couple an end of an optical cable to an optoelectronic module includes a first portion and a second portion. The first portion is configured to engage a latch slot of the optoelectronic module to retain within the optoelectronic module a ferrule optically coupled to optical fibers of the optical cable. The second portion is configured to engage the ferrule to prevent removal of the ferrule from within the optoelectronic module when the first portion engages the latch slot.

In another example embodiment, a system comprising includes an optical cable and a pluggable connector. The optical cable includes a cable jacket and optical fibers disposed within the cable jacket, where the optical fibers include ends that extend out of the cable jacket. The pluggable connector is configured to removably couple an end of the optical cable to an optoelectronic module and includes a first portion and a second portion. The first portion is configured to engage a latch slot of the optoelectronic module to retain within the optoelectronic module a ferrule optically coupled to the optical fibers. The second portion engages the ferrule to prevent removal of the ferrule from within the optoelectronic module when the first portion engages the latch slot.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Embodiments disclosed herein relate to optical components. More particularly, some example embodiments relate to a pluggable connector for an optoelectronic module. The pluggable connector may be attached to an end of an optical cable. The pluggable connector may be removably secured to the optoelectronic module to, e.g., optically couple one or more optical fibers of the optical cable to a lens or lens assembly of the optoelectronic module. In some embodiments, the pluggable connector is permanently attached to the end of the optical cable. In other embodiments, the pluggable connector is removably attached to the end of the optical cable. Alternatively or additionally, the pluggable connector may include a clip to removably secure a ferrule based optical cable to the optoelectronic module. Alternatively or additionally, the pluggable connector may include a converter to convert a ferrule based optical cable to a pluggable optical cable. Embodiments described herein additionally relate to heat flow in such optoelectronic modules.

An example embodiment includes a pluggable connector that is configured to maintain engagement of the optical cable to the optoelectronic module, and more particularly to a lens assembly of the optoelectronic module. The pluggable connector enables the optical cable to be disengaged from the lens assembly without disassembling the optoelectronic module. The ability to disengage the optical cable from the lens assembly without disassembling the optoelectronic module may facilitate easier modular testing of the optoelectronic module. Embodiments described herein may also include a configuration of a pluggable connector which includes a converter that is capable of converting a ferrule based optical cable into a pluggable cable, and/or a clip configured to connect a ferrule based optical cable to an optoelectronic module.

Reference will now be made to the drawings to describe various aspects of some embodiments. It is to be understood that the drawings are diagrammatic and schematic representations of the embodiments, and are not meant to be limiting, nor are they necessarily drawn to scale. Throughout the drawings, like numbers generally reference like structures unless described otherwise.

Figure 1:
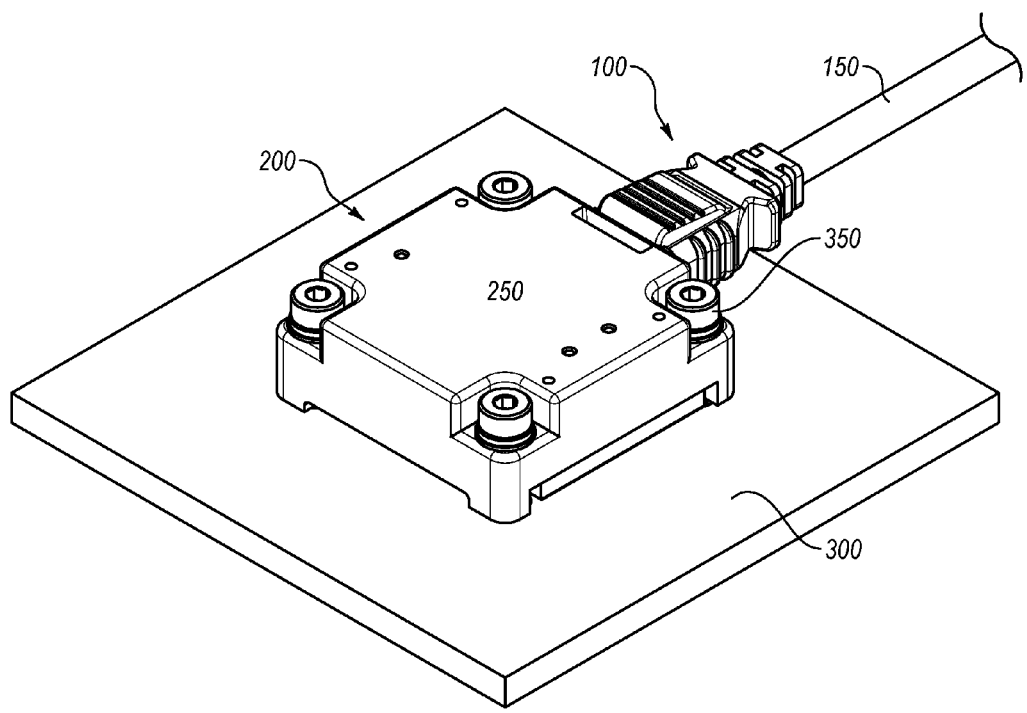
FIG. 1 is a perspective view of an example optoelectronic module and example pluggable connector.
Figure 2:
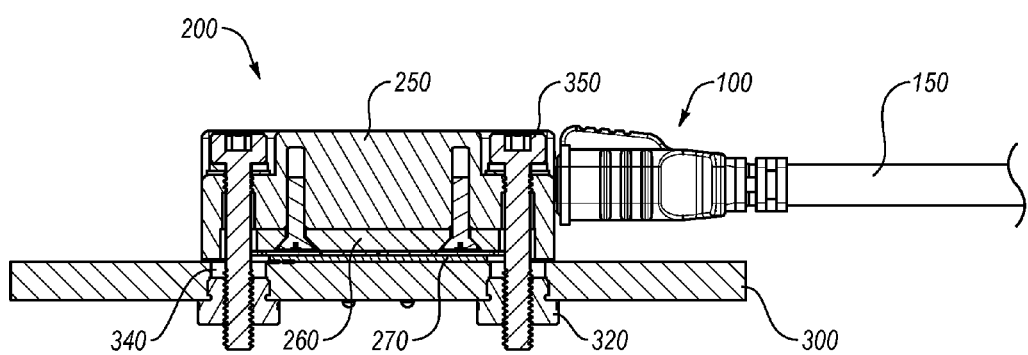
FIG. 2 is a cross-sectional side view of the optoelectronic module and pluggable connector of FIG. 1.
Figure 3:
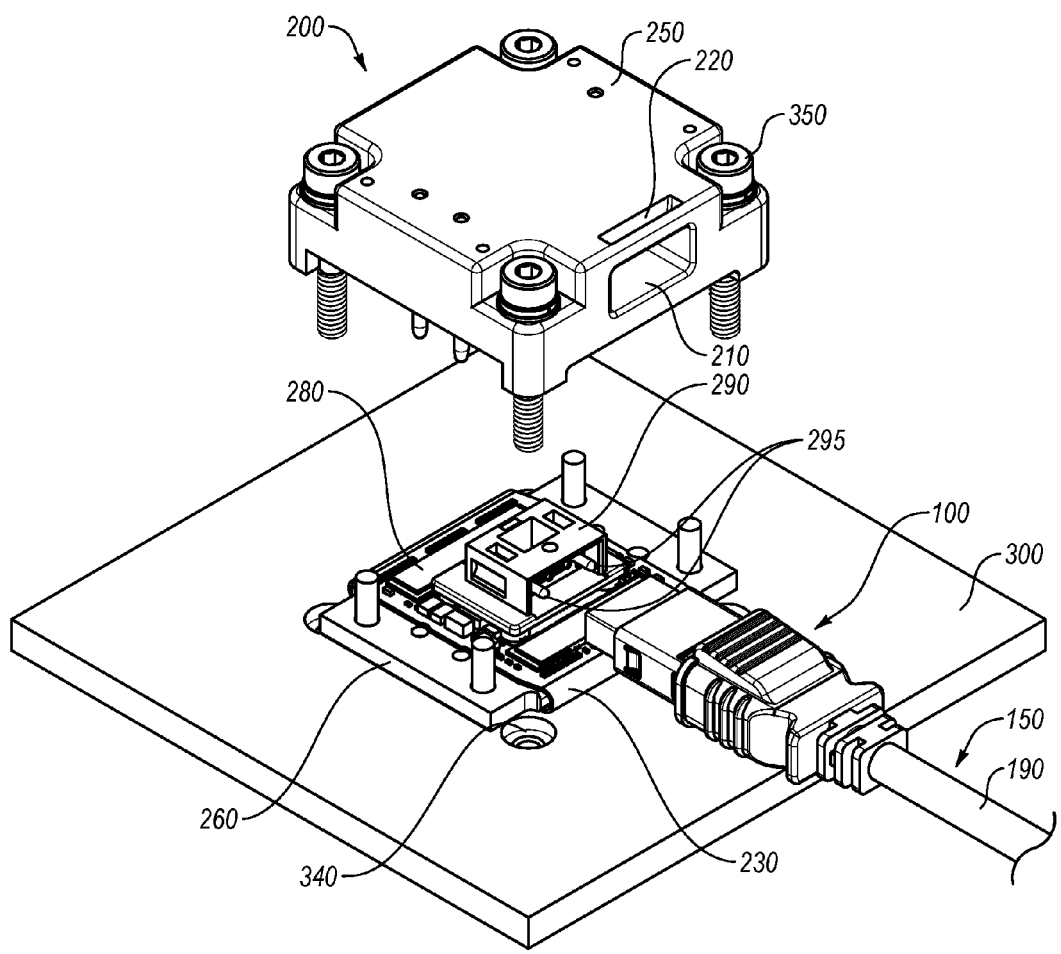
FIG. 3 is an exploded perspective view of the optoelectronic module and the pluggable connector of FIG. 1.

FIGS. 1-3 include various views of an example optoelectronic module 200 and example pluggable connector 100, arranged in accordance with at least one embodiment described herein. Specifically, FIG. 1 is a perspective view of the optoelectronic module 200 mounted on a host circuit board or PCB 300 (hereafter "host PCB 300") of a host device, with the pluggable connector 100 connecting optical fibers 165 (FIG. 5A) of an optical cable 150 to the optoelectronic module 200. FIG. 2 is a cross-sectional side view of the optoelectronic module 200 and pluggable connector 100 of FIG. 1. FIG. 3 is an exploded perspective view of the optoelectronic module 200 and the pluggable connector 100. FIGS. 1-3 illustrate screws 350 which extend through the optoelectronic module 200 and corresponding holes 340 in the host PCB 300. The screws 350 may be used in association with nuts 320 to secure and mount the optoelectronic module 200 to the surface of the host PCB 300.

The optoelectronic module 200 depicted in FIGS. 1-3 is implemented as a BOA. For example, the BOA may include a 10 gigabit per second (Gb/s) optical engine, a 25 Gb/s optical engine, or other suitable BOA. Accordingly, the optoelectronic module 200 may be designed for high-speed (e.g., 25 Gb/s or higher) optical interconnects between integrated circuits and/or between circuit boards. Additionally or alternatively, the optoelectronic module 200 may be configured to transmit and/or receive twelve, twenty-four, or other quantity of optical channels, each of which may be configured to communicate data.

After being mounted to the host PCB 300, the optoelectronic module 200 may be configured to communicate data between the host device and a network (not shown), for example. The optoelectronic module 200 may convert electrical signals to optical signals representing the electrical signals and vice versa. For example, data in the form of optical signals may be communicated from a network along the optical cable 150 to the optoelectronic module 200. Components (examples of which are described below) of the optoelectronic module 200 may convert the optical signals to electrical signals representative of the optical signals. The electrical signals may then be communicated to the host device. Likewise, the host device may communicate electrical signals to the optoelectronic module 200. The optoelectronic module 200 may convert the electrical signals to optical signals representative of the electrical signals. The optical signals may be communicated along the optical cable 150 into the network to, e.g., another optoelectronic module 200.

Figure 6A:
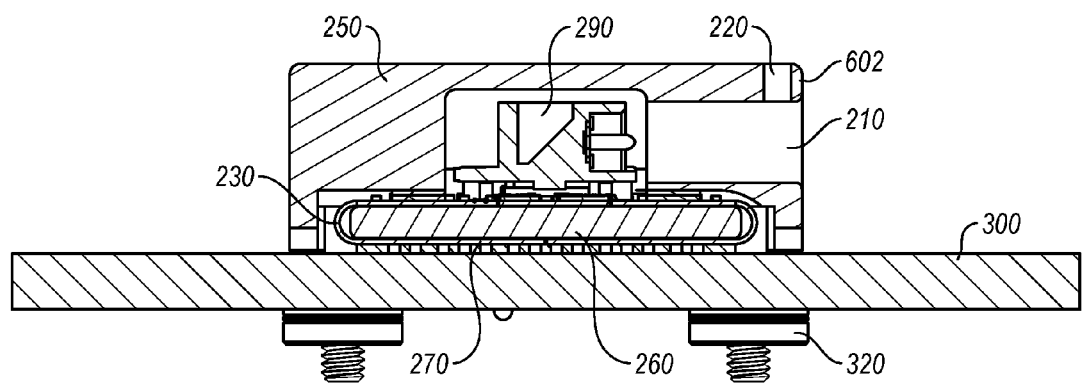
FIGS. 6A-6E are cross-sectional views that collectively illustrate a process of attaching an optical cable to the optoelectronic module of FIG. 1 using the pluggable connector of FIG. 1.

The optoelectronic module 200 may include a module housing 250. The module housing 250 may generally protect components positioned within the module housing 200. Alternately or additionally, the module housing 250 may dissipate heat generated by one or more heat-generating components of the optoelectronic module 200. In the depicted optoelectronic module 200, for example, the optoelectronic module 200 includes a heat spreader 260 thermally coupled to the module housing 250 and to the one or more heat-generating components. The heat spreader 260 is housed within a flex circuit 230, with an interposer 270 formed on a surface thereof, the interposer 270 being positioned beneath the heat spreader 260, as illustrated in FIG. 6A. Although only one heat spreader 260 is included in FIG. 2, in some embodiments, more than one heat spreader 260 may be included in the module housing 250, or more generally in the optoelectronic module 200. Heat generated by the heat-generating components of the optoelectronic module 200 may be transferred from the heat-generating components to the heat spreader 260, which may conductively transfer the heat to the module housing 250. The module housing 250 may dissipate the heat to a surrounding environment and/or may conductively transfer the heat to a heat sink thermally coupled to and/or mounted on a top surface of the module housing 250. Alternatively, the heat spreader 260 may be omitted.

The module housing 250 defines a connector opening 210 (FIG. 3) which extends through the module housing 250 and enables optical fibers 165 (FIG. 5A) of the optical cable 150 to optically couple to a lens assembly 290 (FIG. 3) of the optoelectronic module 200. In particular, as illustrated in FIG. 3, the pluggable connector 100 and the optical cable 150 may exit the optoelectronic module 200 via the connector opening 210 at a relatively horizontal or 0-degree angle, e.g., parallel or substantially parallel to the host PCB 300. The module housing 250 also includes a latch slot 220 (FIG. 3) to receive a latch 125 of the pluggable connector 100, as is described more fully below. All or a portion of the latch 125 may be received within the latch slot 220 to selectively engage the pluggable connector 100 to the optoelectronic module 200.

The optoelectronic module 200 may also include the lens assembly 290, a quad clock and data recovery (QCDR) integrated circuit (IC) 280 or other ICs, and/or other components, which may be positioned within the module housing 250. The heat-generating components may include the QCDR IC 280 and/or other ICs or components. The lens assembly 290 may be positioned above one or more components (not shown) mounted to the flex circuit 230, one or more of which components may include heat-generating components. The heat spreader 260 may be configured to transfer heat from the heat-generating components to the module housing 250, as described more fully below.

The lens assembly 290 may be configured to receive the pluggable connector 100. The pluggable connector 100 may be mechanically coupled to the optical cable 150, e.g., to an end of the optical cable 150. The optical fibers 165 (FIG. 5A) of the optical cable 150 may extend at least partially through the pluggable connector 100 and may be optically coupled to the lens assembly 290 such that optical signals may be communicated between the optical fibers 165 and the lens assembly 290. Incoming or receive (RX) optical signals may be received from one or more of the optical fibers 165 at the lens assembly 290, which may communicate the incoming or RX optical signals to one or more optical receivers or other components mounted to the flex circuit 230 or elsewhere within the optoelectronic module 200. Outgoing or transmit (TX) optical signals may be emitted or transmitted by one or more optical transmitters or other components mounted to the flex circuit 230 or elsewhere within the optoelectronic module 200. The outgoing or TX optical signals may be communicated by the lens assembly 290 to one or more of the optical fibers 165 for outbound transmission of the outgoing or TX optical signals. Accordingly, the pluggable connector 100 is an example of an optical interface at least because it supports the optical fibers 165 that communicate the optical signals to and from the optoelectronic module 200. As used herein, the term "optical interface" may be used to describe the pluggable connector 100 and similar and/or analogous structures that provide support for optical fibers that communicate optical signals to and from optoelectronic modules. The optical fibers 165 may be implemented as multiple individual fibers, ribbon optical fibers, or other suitable optical fibers.

With reference to FIGS. 1-3, engagement and alignment between the pluggable connector 100 and the lens assembly 290 may be maintained by a latch or a clip as is described more fully below. Specifically, the latch or clip may retain the pluggable connector 100 and enable the pluggable connector 100 to be removed from the optoelectronic module 200 and reinserted so as to disconnect and connect the optical cable 150 with the lens assembly 290. The latch or clip may allow the pluggable connector 100 or other optical interface to be selectively retained by the optoelectronic module 200. When the pluggable connector 100 is received in the lens assembly 290, the latch and/or clip described below may latch the pluggable connector 100 to the lens assembly 290 and/or to the module housing 250 as described in more detail herein.

Figure 4:
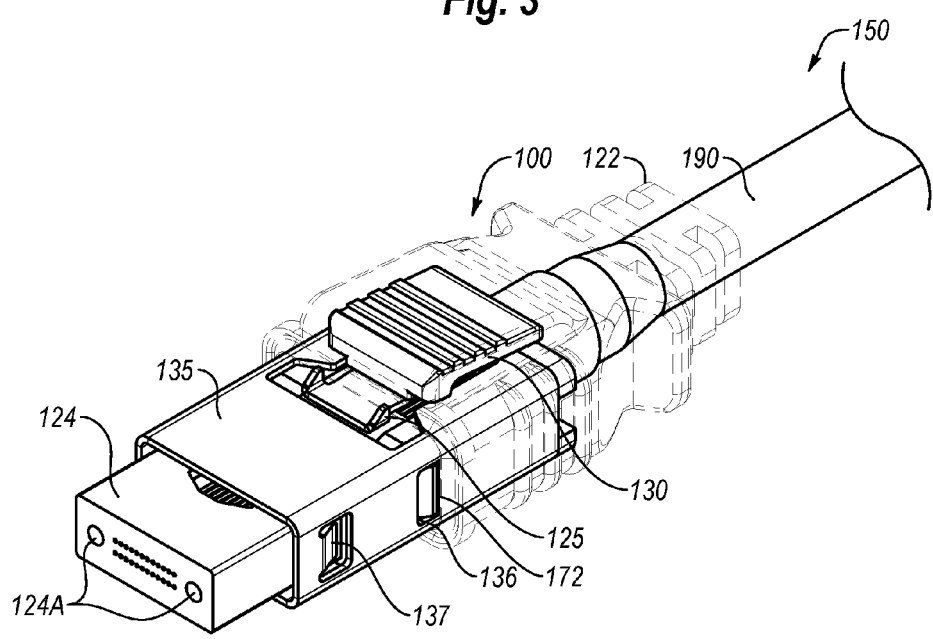
FIG. 4 is a perspective view of the pluggable connector of FIG. 1.

FIG. 4 is a perspective view of the pluggable connector 100 of FIG. 1, arranged in accordance with at least one embodiment described herein. In the example of FIG. 4, the pluggable connector 100 includes the latch 125. More particularly, the pluggable connector 100 includes two latches 125, although only one is labeled in FIG. 4 and other Figures herein. A similar convention has been followed for other redundant or duplicate components in this and/or other figures where only one or some, but not, all of the redundant or duplicate components are labeled. The pluggable connector 100 may include one or more latches 125.

Figure 5A:
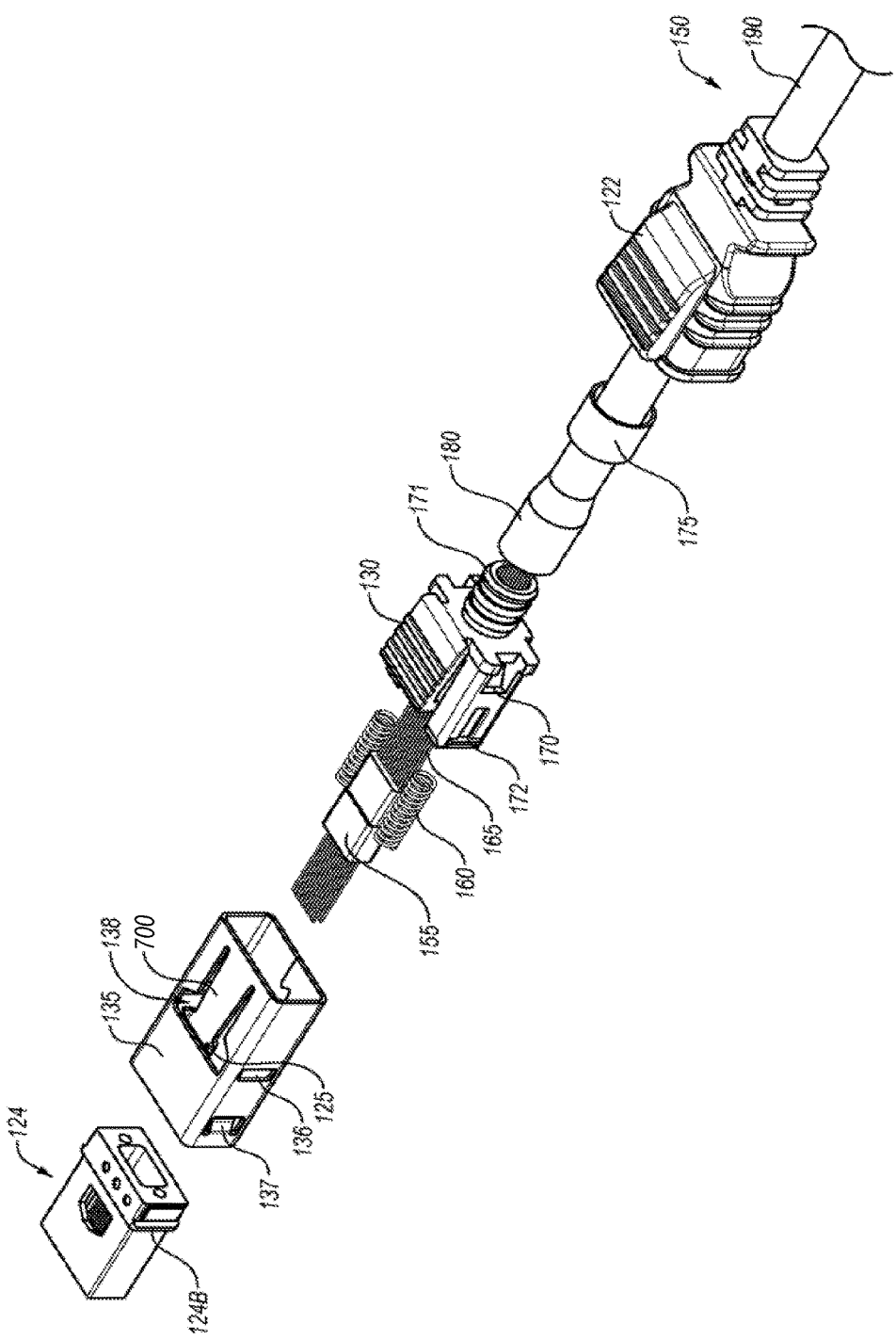
FIG. 5A is an exploded perspective view of the pluggable connector of FIG. 1.

FIG. 5A is an exploded perspective view of the pluggable connector 100 of FIG. 1, arranged in accordance with at least one embodiment described herein.

With reference to FIGS. 4 and 5A, the optical cable 150 may include a cable jacket 190 and optical fibers 165, and the pluggable connector 100 may include a boot or dust seal 122, a crimp ring 175, and a crimp ring base 170. The cable jacket 190 may be attached to the crimp ring base 170 by inserting a neck 171 of the crimp ring base 170 into an end 180 of the cable jacket 190. The crimp ring 175 may then be crimped at the end 180 of the cable jacket 190 with the neck 171 of the crimp ring base 170 positioned within the end 180 of the cable jacket 190.

The crimp ring base 170 includes a latch release component or tab 130, which as described below, may be operated to cause the latch 125 to disengage from the latch slot 220 of the optoelectronic module 200, enabling the pluggable connector 100 to be removed from the optoelectronic module 200. The cable jacket 190 generally houses the optical fibers 165, which have ends that extend out of the cable jacket 190 and at least partially through the crimp ring 175 and the crimp ring base 170. The pluggable connector 100 additionally includes a ferrule boot 155 which is disposed within the crimp ring base 170 with a pair of springs 160, and a ferrule 124 which connects to the lens assembly 290. When assembled, a connector shell 135 of the pluggable connector 100 houses a portion of the ferrule 124, the springs 160, the ferrule boot 155, ends of the optical fibers 165, and a portion of the crimp ring base 170. The ferrule 124 may include a mechanical transfer (MT) ferrule or other suitable ferrule.

The connector shell 135 may include crimp ring slots 136 (FIGS. 4 and 5A) formed in opposite sides thereof and the crimp ring base 170 may include crimp ring latches 172 (FIGS. 4 and 5A) disposed on opposite sides thereof. When the pluggable connector is fully assembled (FIG. 4), the crimp ring latches 172 may be received by the crimp ring slots 136 such that the crimp ring base 170 engages the connector shell 135 and remains coupled thereto. The connector shell 135 and other connector shells described herein may include a sheet metal shell or other suitable connector shell.

The connector shell 135 additionally includes a pair of rearward and inward directed tabs 137 (FIGS. 4 and 5A) disposed on opposite sides thereof and the ferrule 124 includes a pair of shoulders 124B (FIG. 5A) disposed on opposite sides thereof at a back end thereof. When assembled, the ferrule 124 is positioned inside the connector shell 135 so that the rearward and inward directed tabs 137 of the connector shell 135 are in front of the shoulders 124B of the ferrule 124. The rearward and inward directed tabs 137 engage the shoulders 124B and prevent the ferrule 124 from moving forward out of the connector shell 135.

When assembled, one or more of the boot 122, the crimp ring 175, the crimp ring base 170, the ferrule boot 155, the springs 160, the ferrule 124, and the connector shell 135 may form the pluggable connector 100. As described below, the pluggable connector 100 may be attached to and detached from the lens assembly 290 of the optoelectronic module 200 without disassembling the optoelectronic module 200. More specifically, as the pluggable connector 100 is slid into the connector opening 210 and connected to the lens assembly 290, the latch 125 extends into the latch slot 220. When the latch 125 extends into the latch slot, the latch 125 secures the pluggable connector 100 within the connector opening 210 and the pluggable connector 100 to the lens assembly 290 of the optoelectronic module 200.

As illustrated in FIG. 4, the ferrule 124 includes a pair of alignment slots 124A. The pair of alignment slots 124A cooperate with a pair of alignment pins 295 (FIGS. 3 and 6B) of the lens assembly 290 to optically align the optical fibers 165 with the lens assembly 290 as the pluggable connector 100 is inserted into the connector opening 210.

Figure 6B:
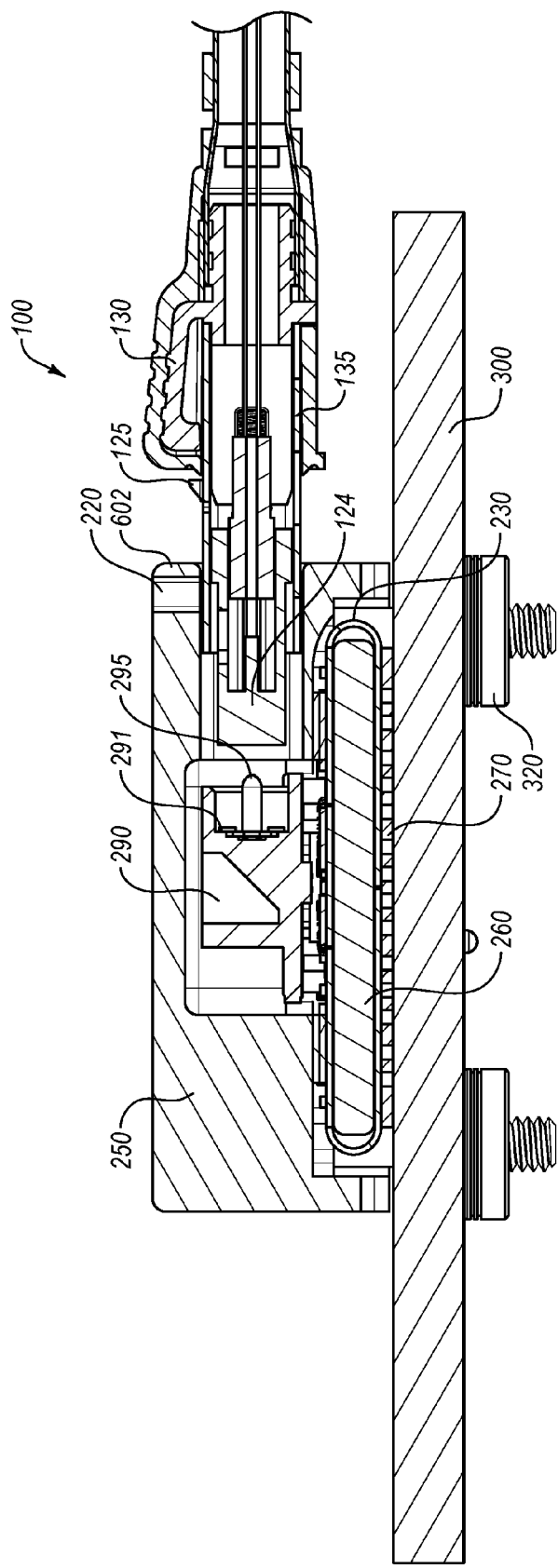
Figure 6C:
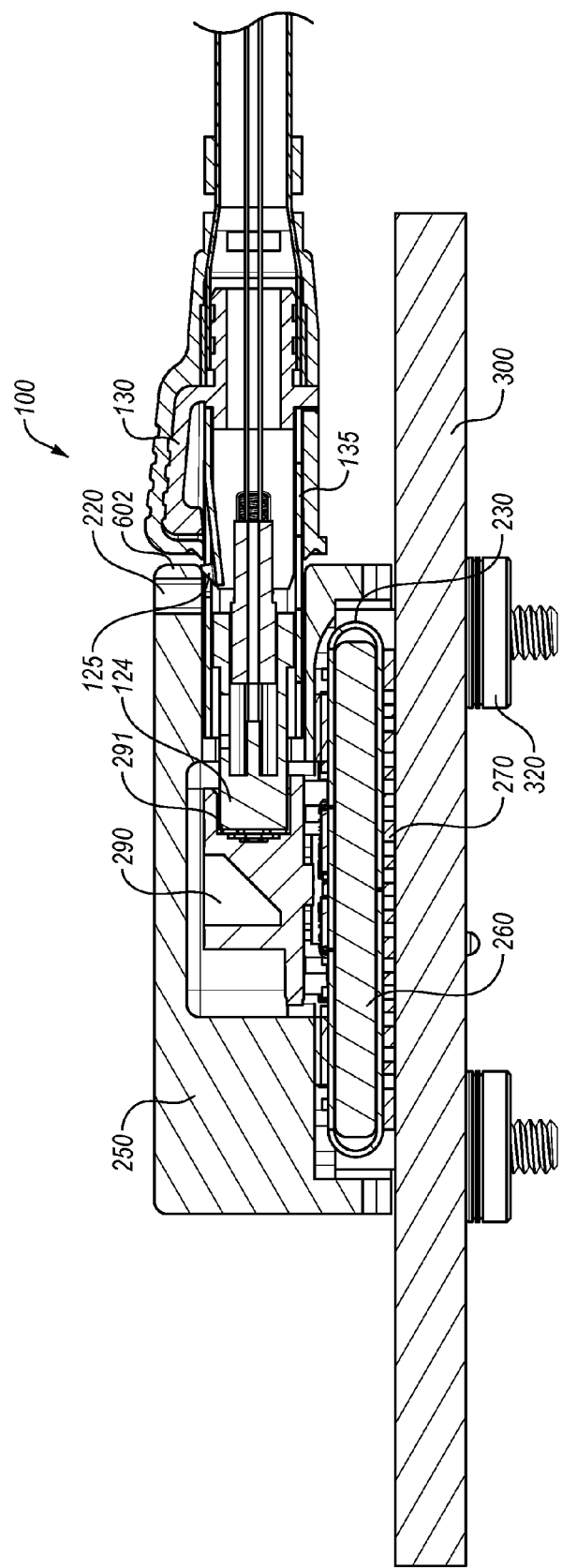
Figure 6D:
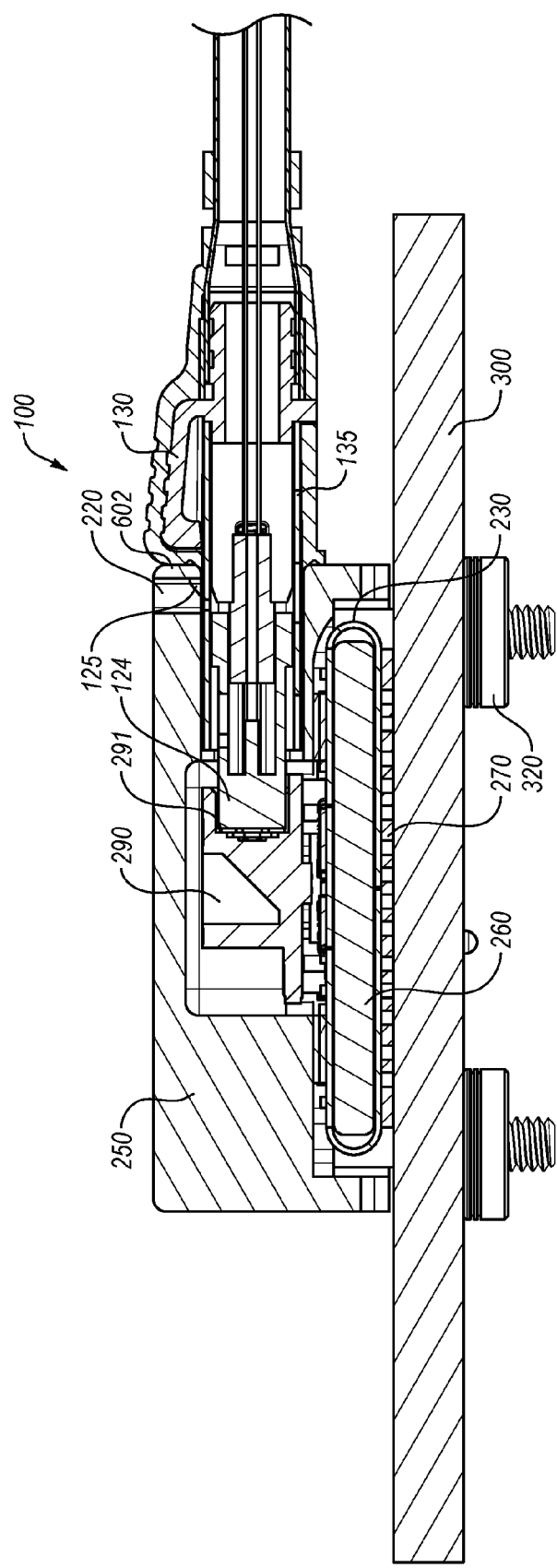

FIGS. 6A-6E are cross-sectional views that collectively illustrate a process of attaching the optical cable 150 to the optoelectronic module 200 using the pluggable connector 100, arranged in accordance with at least one embodiment described herein. As generally illustrated by FIGS. 6A-6E, engagement and alignment between the pluggable connector 100 and the lens assembly 290 may be maintained by the latching components (e.g., the latch 125) of the pluggable connector 100. FIG. 6A is a cross-sectional side view of the optoelectronic module 200 mounted to the host PCB 300 without the pluggable connector 100 and the optical cable 150 attached to the optoelectronic module 200. FIG. 6B is a cross-sectional side view of the optoelectronic module 200 mounted to the host PCB 300 as the pluggable connector 100 is inserted into the connector opening 210 of the module housing 250. As is illustrated in FIG. 6B, the ferrule 124 enters the connector opening 210 and approaches the lens assembly 290 of the optoelectronic module 200. Then, as illustrated in FIG. 6C, the latch 125 formed in the connector shell 135 of the pluggable connector 100 is depressed, e.g., deflected downward, as an angled leading edge or ramp of the latch 125 contacts and passes under a leading wall 602 of the module housing 250. The latch 125 is located at an end of a peninsula-shaped portion or tongue 700 of the connector shell 135. The tongue 700 may be resilient such that it may be deflected up or down, at least within a prescribed range of motion, and return to its initial state without being permanently deformed. As the latch 125 is depressed towards the inside of the connector opening 210, a restoring spring force is created in the tongue 700 (FIG. 5A), which urges the latch 125 upward. The leading wall 602 prevents the latch 125 from moving upward until the pluggable connector 100 is fully inserted, e.g., until the leading wall 602 is cleared by the latch 125 and the latch 125 is forced upward into the latch slot 220 by the restoring spring force. FIG. 6D illustrates the pluggable connector 100 fully inserted into the connector opening 210 of the optoelectronic module 200, with the latch 125 extending upward into the latch slot 220.

As the pluggable connector 100 is being inserted as illustrated in, e.g., FIGS. 6B and 6C, the pair of alignment pins 295 (FIGS. 3 and 6B) of the lens assembly 290 are received by the pair of alignment slots 124A (FIG. 4) of the ferrule 124. The pair of alignment pins 295 guide the ferrule 124 into alignment with the lens assembly 290 (e.g., optical alignment between lens assembly 290 and the optical fibers 165), the ferrule 124 sliding forward until being stopped on standoffs 291 (FIG. 6B) of the lens assembly 290. When the ferrule 124 reaches the standoffs 291, its forward motion may stop. The springs 160 (FIG. 5A) may be compressed against the ferrule 124 by additional forward motion of the crimp ring base 170 (FIG. 5A) and the connector shell 135 relative to the ferrule 124 until the latch 125 clears the leading wall 602 to extend upward into the latch slot 220, as previously described. With the springs compressed 160 by engagement between the latch 125 and the latch slot 220/leading wall 602, the springs 160 may exert a holding force that urges the ferrule 124 forward to hold the ferrule 124 against the lens assembly 290 and maintain contact between the ferrule 124 and the lens assembly 290. The holding force may also aid in the removal of the pluggable connector 100 which will be discussed further below.

Figure 6E:
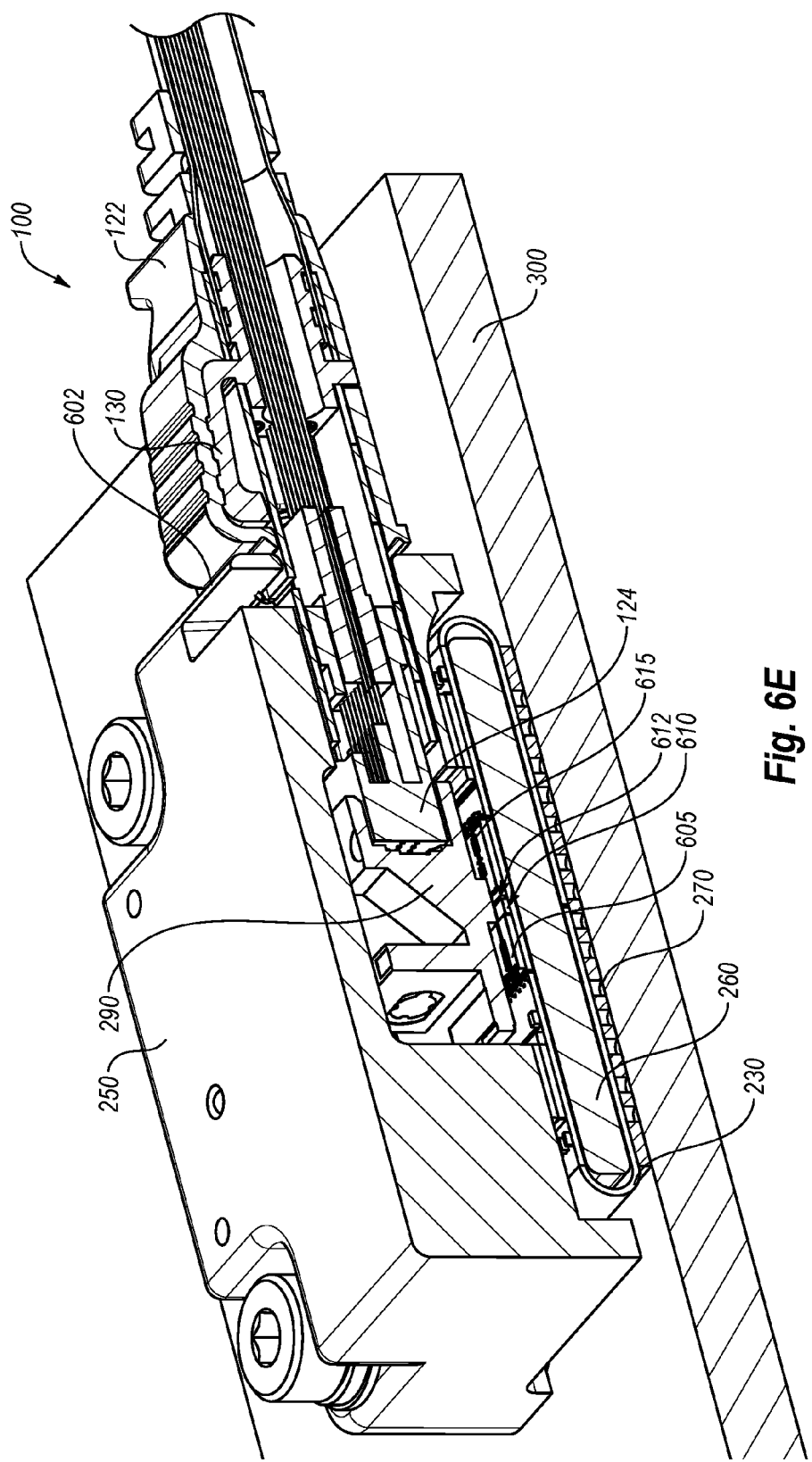

As illustrated in FIG. 6D, and as previously described, with sufficient forward motion of the pluggable connector 100 into the connector opening 210, the latch 125 reaches the latch slot 220, where the restoring spring force in the tongue 700 (FIG. 5A) urges the latch 125 upward and into the latch slot 220. With the latch 125 positioned within the latch slot 220, the pluggable connector 100 is secured to the optoelectronic module 200. FIG. 6E is a cross-sectional perspective view of the pluggable connector 100 securely connected to the optoelectronic module 200.

FIG. 6E also illustrates additional components that may be included in the optoelectronic module 200. The additional components may include a transimpedance amplifier (TIA) or TIA array 605, a pin array and monitor photo diode (MPD) 610, a vertical-cavity surface-emitting laser (VCSEL) array 612, and a laser driver or laser driver array 615. The TIA 605, the pin array and MPD 610, the VCSEL array 612, and the laser driver 615 may be attached to the flex circuit 230 and are examples of heat-generating components. These and/or other components of the optoelectronic module 200 may generate heat that may be dissipated through the heat spreader 260 and the module housing 250, as described in more detail below.

Figure 7:
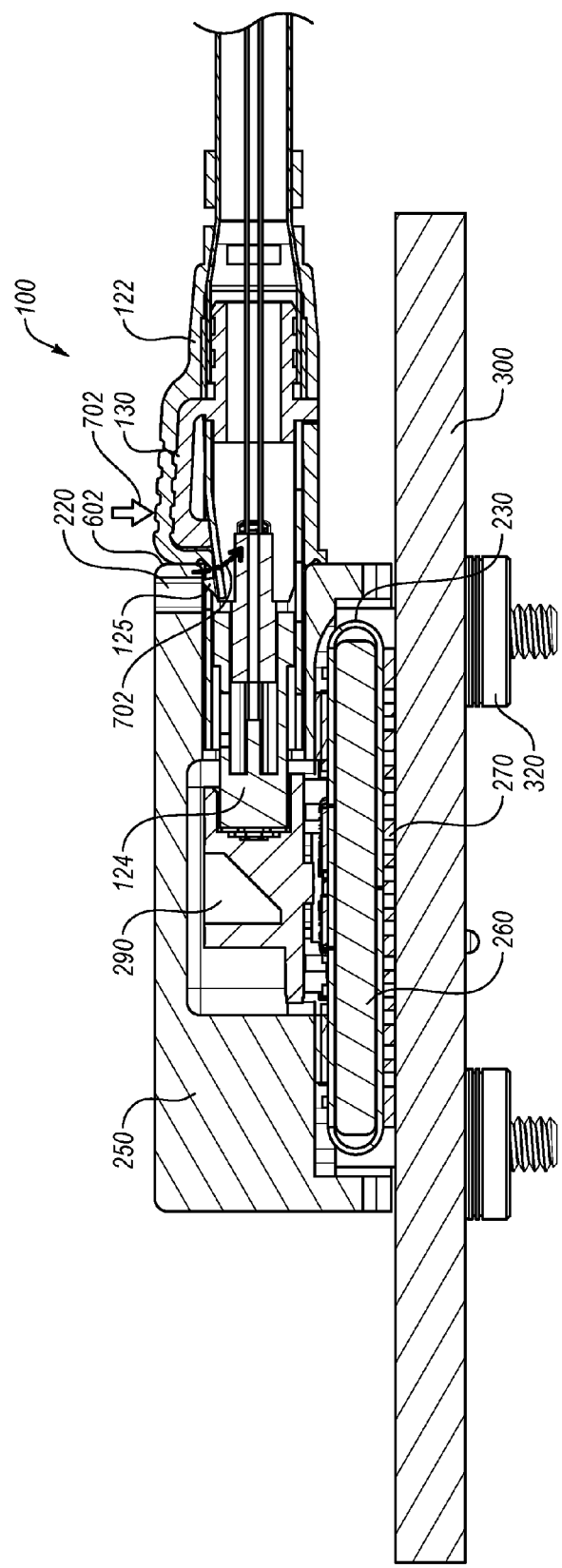
FIG. 7 is a cross-sectional side view illustrating a process of removing the pluggable connector and the optical cable of FIG. 1 from the optoelectronic module of FIG. 1.

FIG. 7 is a cross-sectional side view illustrating a process of removing the pluggable connector 100 and the optical cable 150 from the optoelectronic module 200, arranged in accordance with at least one embodiment described herein. Application of a sufficient force, denoted by arrow 702, to the tab 130 depresses the tab 130, which applies a force denoted by arrow 704 to the tongue 700 of the connector shell 135, where the latch 125 is formed at the end of the tongue 700. As the force 704 is applied to the tongue 700, the latch 125 is deflected downward and away from and out of the latch slot 220, e.g., until the latch 125 clears a bottom of the leading wall 602 in the vertical direction, enabling the pluggable connector 100 to be removed from the optoelectronic module 200. As previously mentioned, the springs 160 within the pluggable connector 100 may be under compression when the pluggable connector 100 is fully inserted into the optoelectronic module 200. Accordingly, after the tab 130 is depressed and the latch 125 is moved away from and out of the latch slot 220, the compression of the springs 160 urges the connector shell 135 that includes the latch 125 backwards to aids in the removal of the pluggable connector 100 from the optoelectronic module 200.

Figure 5B:
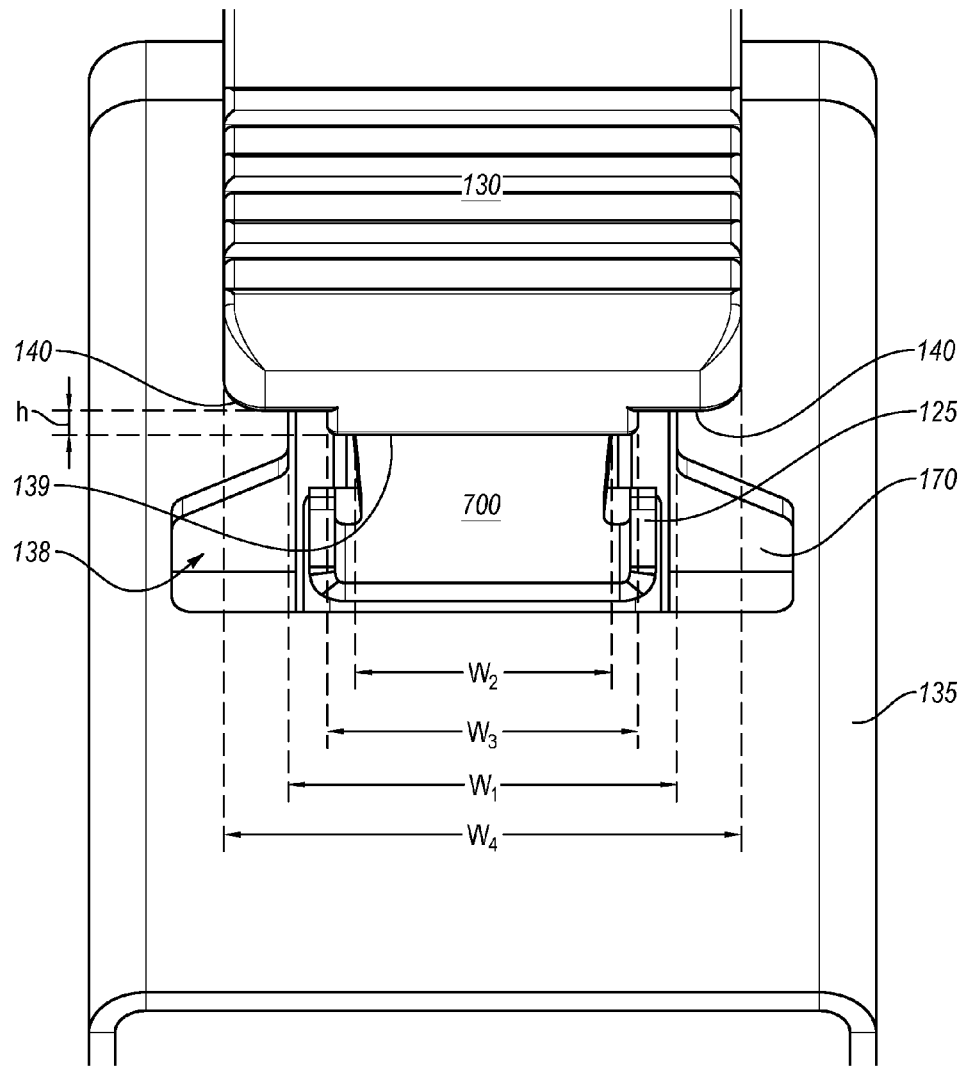
FIG. 5B is a top perspective view of a connector shell and crimp ring base of the pluggable connector of FIG. 1.

Optionally, the pluggable connector 100 may include one or more hard stops to prevent the tongue 700 from being depressed too far and becoming permanently deformed. Such an example will now be described with reference to FIG. 5B. FIG. 5B is a top perspective view of the connector shell 135 and the crimp ring base 170, arranged in accordance with at least one embodiment described herein. As illustrated in FIG. 5B, the connector shell 135 defines an opening 138, which is also labeled in FIG. 5A. It can be seen from FIGS. 5A and 5B that the tongue 700 extends into the opening 138. In a region beneath the tab 130, the opening 138 has a width $w_1$ and the tongue 700 has a width $w_2$ that is less than the width $w_1$ of the opening 138. The smaller width $w_2$ of the tongue 700 relative to the width $w_1$ of the opening 138 allows the tongue 700 to be depressed relative to the rest of the connector shell 135.

FIG. 5B additionally illustrates a protrusion 139 of the tab 130 of the crimp ring base 170. The protrusion 139 extends downward by a height h from hard stops 140 of the tab 130. The protrusion 139 is positioned above the tongue 700 and has a width $w_3$ that is less than the width $w_1$ of the opening 138. Because the width $w_3$ of the protrusion 139 is less than the width $w_1$ of the opening 138, when the tab 130 is depressed downward, the protrusion 139 can contact the tongue 700 and force it downward through the opening 138 without interference from the rest of the connector shell 135. The hard stops 140 extend outward from a location of the tab 130 above the protrusion 130. The tab 130 has a hard stop-to-hard stop width $w_4$ that is greater than the width $w_1$ of the opening 138.

In response to the tab 130 being depressed such that a bottom of the protrusion 139 is depressed into the opening 138 by the height h such that the tongue 700 is depressed downward, and because the hard stop-to-hard stop width $w_4$ is greater than the width $w_1$ of the opening 138, the connector shell 135 may contact and engage the hard stops 140 of the tab 130 and prevent further downward depression of the tab 130 or the tongue 700. The hard stops 140 may thereby prevent downward deflection or depression of the tongue 700 beyond a predetermined distance determined by the height h of the protrusion 139, which may prevent the tongue 700 from being depressed too far and becoming permanently deformed. The predetermined distance the tongue 700 is permitted to deflect downward may be equal to, substantially equal to, or greater than the height h of the protrusion 139. The predetermined distance may be selected (by appropriate selection of the height h of the protrusion 139) to be sufficient for the latch 125 to be deflected downward and out of the latch slot 220 of the optoelectronic module 200 such that the pluggable connector 100 and the end of the optical cable 150 may be removed from the optoelectronic module 200.

Figure 8:
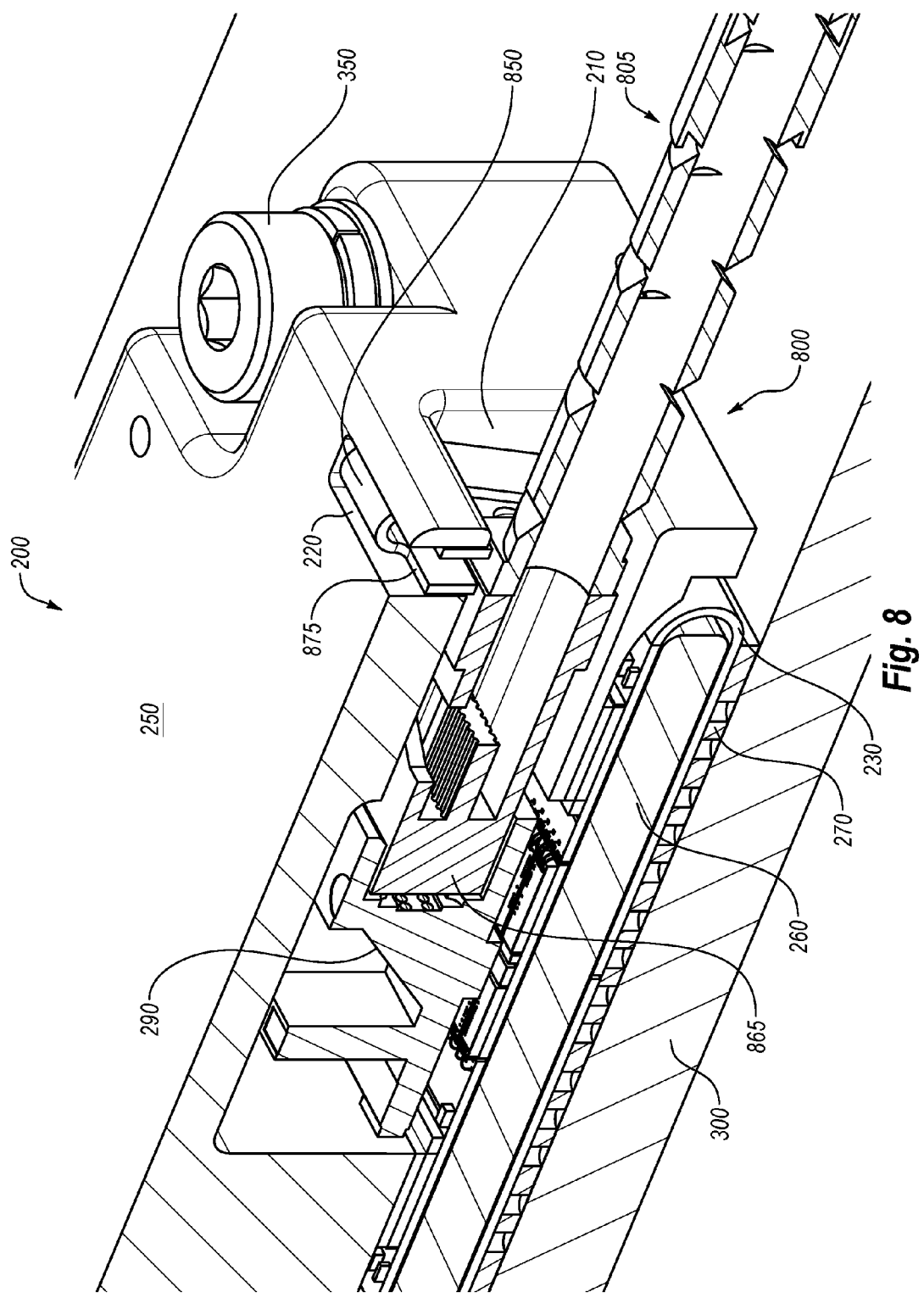
FIG. 8 is a cross-sectional perspective view of the optoelectronic module of FIG. 1 and another pluggable connector.
Figure 9:
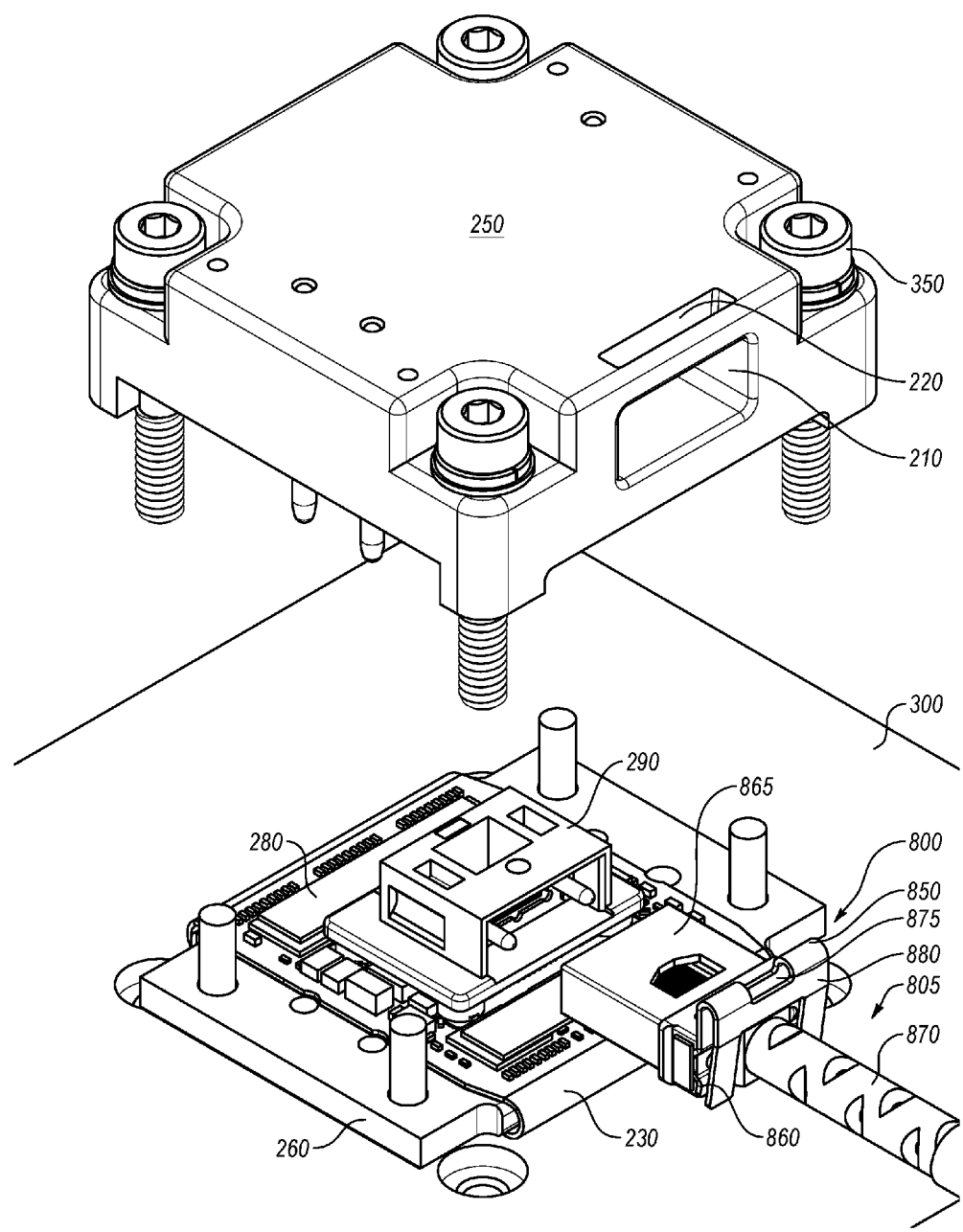
FIG. 9 is an exploded perspective view of the optoelectronic module of FIG. 1 and the pluggable connector of FIG. 8.

FIG. 8 is a cross-sectional perspective view of the optoelectronic module 200 of FIG. 1 and another pluggable connector 800, arranged in accordance with at least one embodiment described herein. FIG. 9 is an exploded perspective view of the optoelectronic module 200 and the pluggable connector 800, arranged in accordance with at least one embodiment described herein. The optoelectronic module 200 illustrated in FIGS. 8 and 9 and other Figures is the same as described elsewhere herein.

In FIGS. 8 and 9, the pluggable connector 800 includes a ferrule 865 which may be similar or identical to the ferrule 124 described above, and a clip 850 which may be inserted into the optoelectronic module 200 to retain the pluggable connector 800 within the connector opening 210 of the optoelectronic module 200. The ferrule 865 may include a mechanical transfer (MT) ferrule or other suitable ferrule. The pluggable connector 800 may be mechanically coupled to an end of an optical cable 805 that includes a cable jacket 870 and optical fibers (not shown) that extend at least partially into the ferrule 865. The ferrule 865 of FIGS. 8 and 9 and other ferrules described herein couple light between the lens assembly 290 and the corresponding optical fibers of the optical cable to which the ferrule is attached. As illustrated in FIG. 8, the clip 850 may be inserted into the latch slot 220 of the module housing 250 to retain the pluggable connector 800 within the optoelectronic module 200.

When the ferrule 865 is received by the lens assembly 290 and/or fully inserted into the connector opening 210, the clip 850 is configured to be retained within the latch slot 220. A portion of the clip 850 extends downward and adjacent to a back side of the ferrule 865 to thereby prevent the ferrule 865 from moving backward out of the connector opening 210 until the clip 850 is removed from the latch slot 220. When installed, the clip 850 may generally surround the optical cable 805 within the connector opening 210 to thereby prevent or substantially prevent ingress of dust and/or other particles into the interior of the module housing 250. More particularly, the pluggable connector 800 including the ferrule 865 may be introduced into the module housing 250 through the connector opening 210. After the pluggable connector 800 is inserted into the module housing 250, a latching portion 880 of the clip 850 may be positioned into the latch slot 220 of the module housing 250. An operator may manipulate the clip 850 to bring the clip 850 substantially perpendicular to the connector opening 210 so as to secure the latching portion 880 into the latch slot 220 and force one or more lever portions 860 (two are illustrated in FIG. 9) of the clip 850 to flex and apply normal force against the back of the ferrule 865 to secure the pluggable connector 800 within the connector opening 210 and maintain force contact between the ferrule 865 and the lens assembly 290.

When the operator desires to remove the pluggable connector 800 from the optoelectronic module 200, the operator hooks the latching portion 880 from above using a hole 875 formed in the latching portion 880 which is accessible through the latch slot 220 and pulls the clip 850 vertically upward and away from the ferrule 865. Then, with the clip 850 removed, the operator applies a removing force to the optical cable 150 to pull the end of the optical cable 150 and the pluggable connector 800 (including the ferrule 865) backwards relative to the optoelectronic module 200 such that the ferrule 865 is separated from the lens assembly 290 and the pluggable connector 800 is removed.

Accordingly, the clip 850 secures the pluggable connector 800 to the lens assembly 290, maintains engagement between the pluggable connector 800 and the lens assembly 290, and enables disengagement of the clip 850 from the module housing 250 and the pluggable connector 800 from the lens assembly 290 and optoelectronic module 200 without removal or disassembly of the optoelectronic module 200. One advantage of the embodiment of FIGS. 8 and 9 that includes the clip 850 is that the clip 850 enables a tighter bend radius of the optical cable 870 such that the relatively smaller pluggable connector 800 (compared to the pluggable connector 100) provides a secure connection in tight fitting module applications.

In the embodiment of FIGS. 8 and 9, to remove the clip 850, an operator may hook the hole 875 of the latch portion 880 of the clip 850 from above or may otherwise activate the lever portion 860 of the clip 850 through the connector opening 210, which may unlatch the latch portion 880 from the latch slot 220, separate the clip 850 from the ferrule 865, and enable the ferrule 865 to be removed from the lens assembly 290. More specifically, an actuation force may be applied to the lever portion 860 of the clip 850. The actuation force may result in a hook or arm portion of the lever portion 860 being displaced vertically, e.g., in a direction perpendicular to the pluggable connector removal direction, which allows the pluggable connector 800 to be separated from the optoelectronic module 200.

Hence, when the latching force no longer acts on the ferrule 865 and the clip 850 is vertically displaced sufficiently to no longer interfere with the ferrule 865, the ferrule 865 may be disengaged from the lens assembly 290.

Figure 10A:
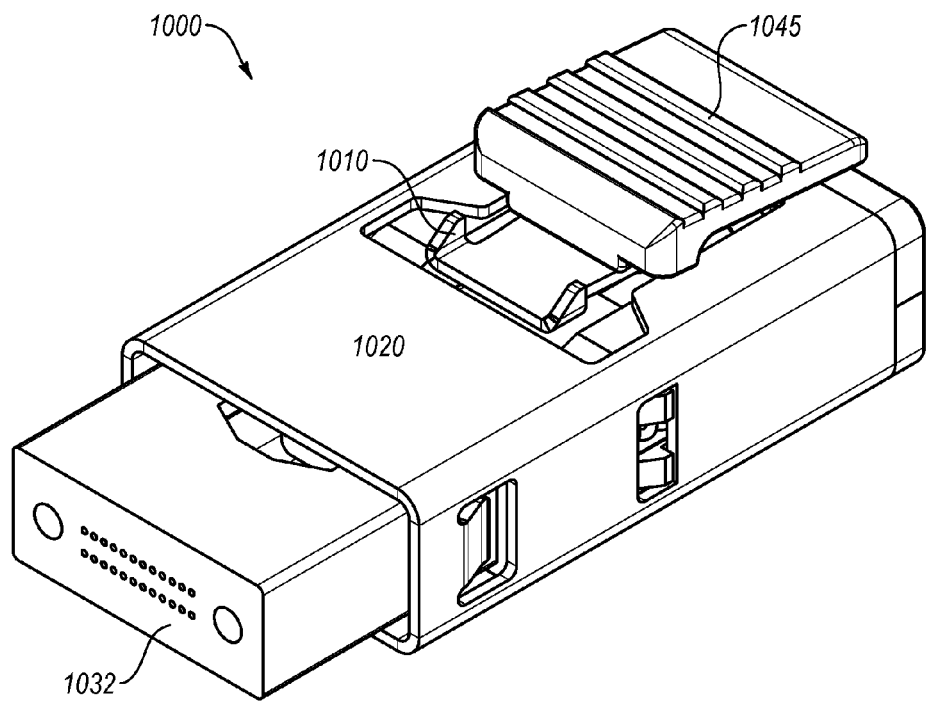
FIGS. 10A and 10B are perspective views of another pluggable connector.
Figure 10B:
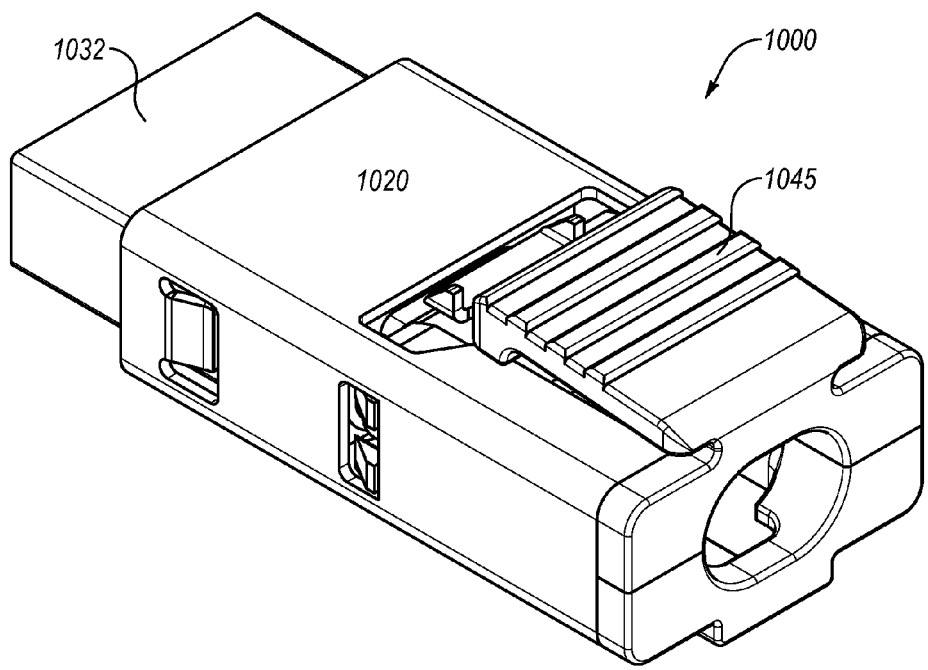
Figure 11A:
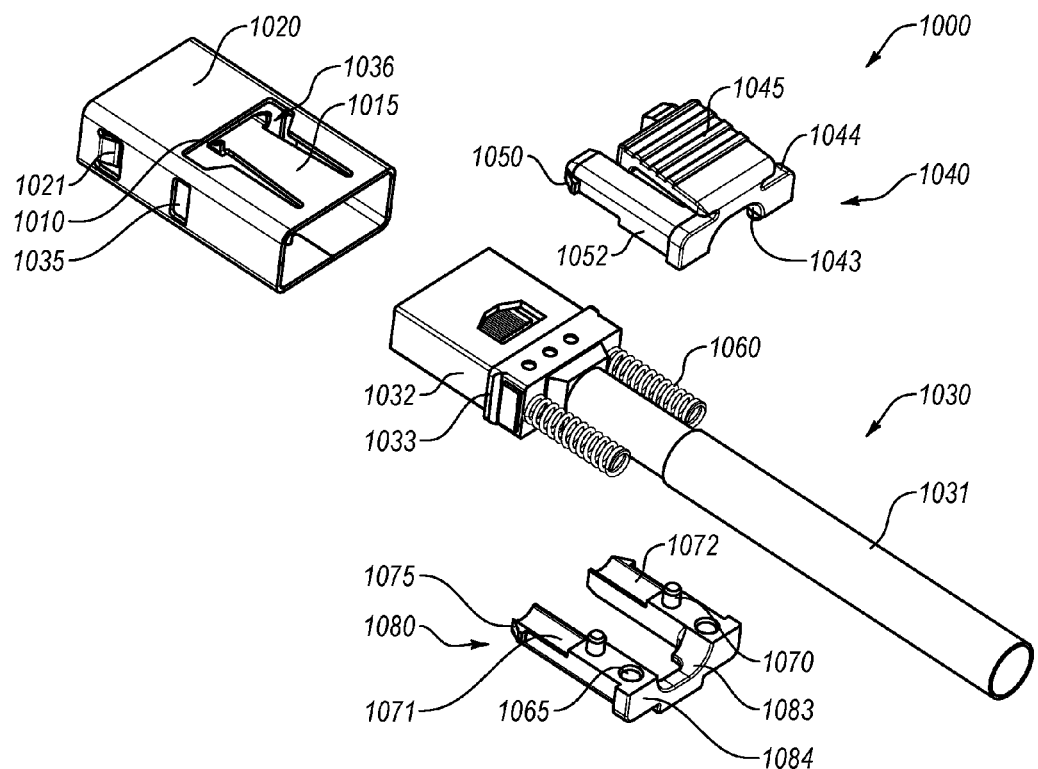
FIG. 11A is an exploded perspective view of the pluggable connector of FIGS. 10A and 10B.
Figure 11B:
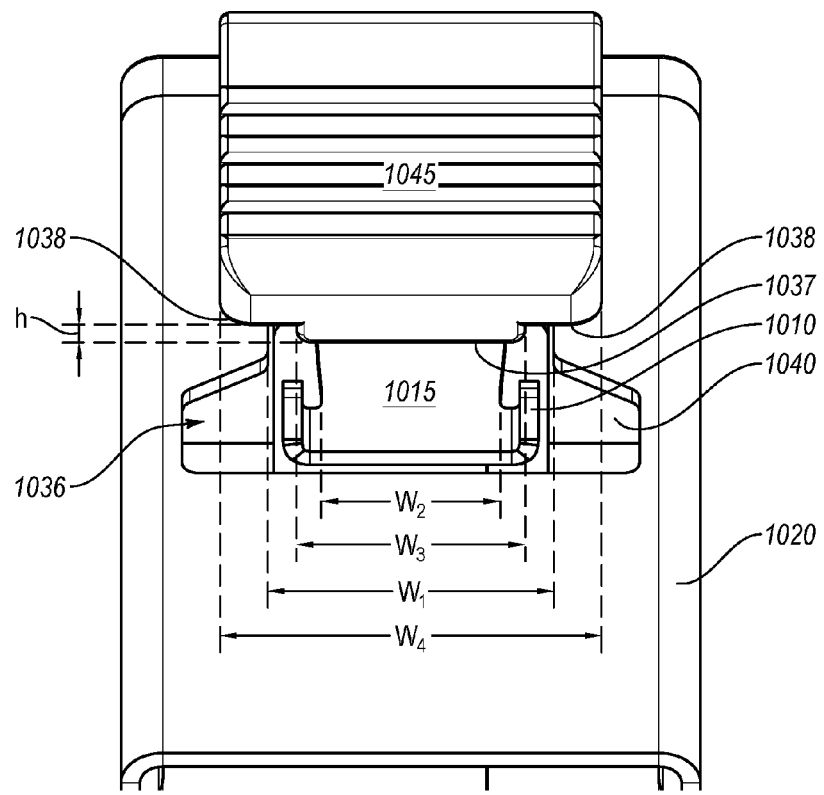
FIG. 11B is a top perspective view of a connector shell and crimp ring base of the pluggable connector of FIGS. 10A and 10B.
Figure 12:
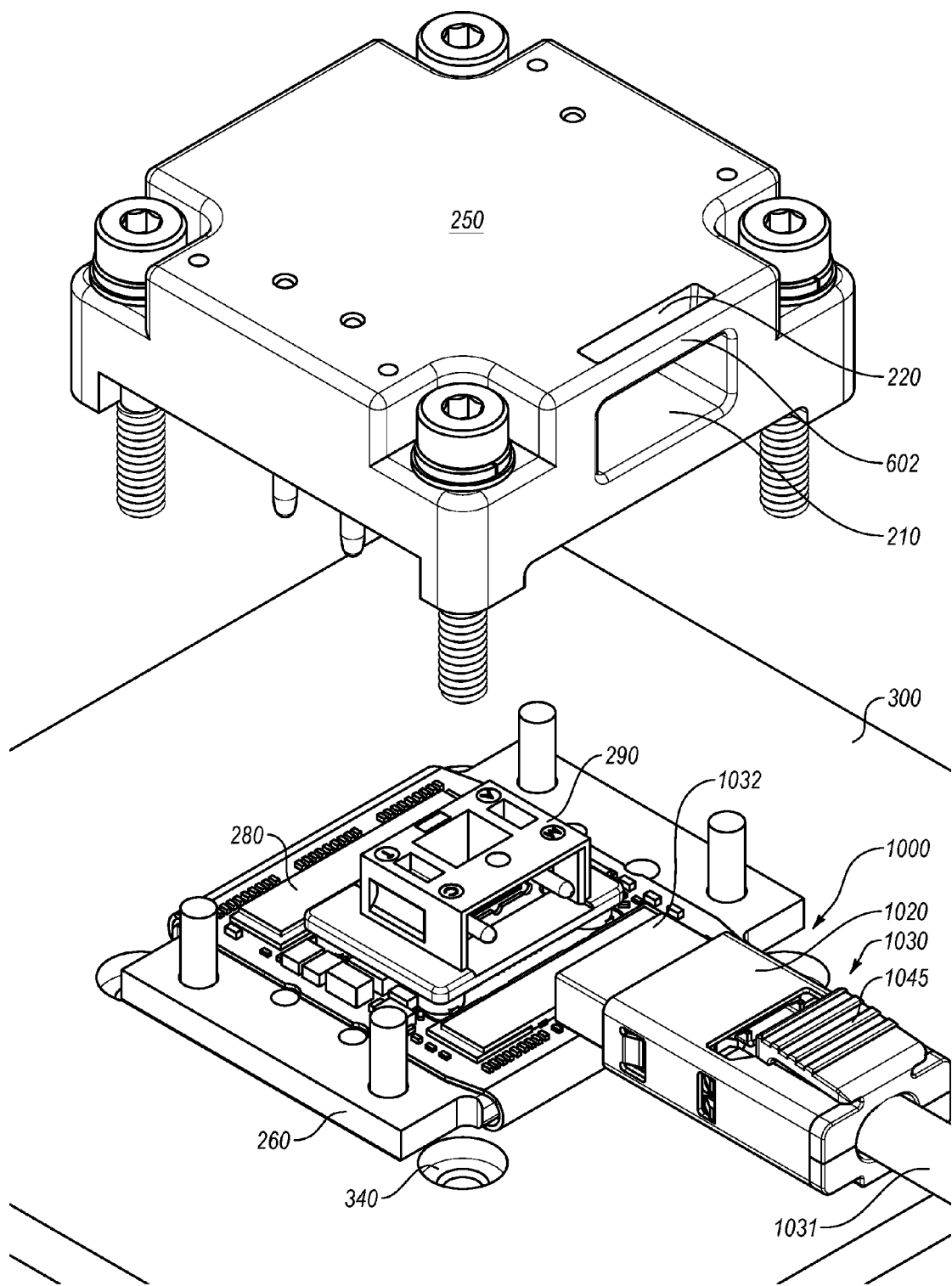
FIG. 12 is an exploded perspective view of the pluggable connector of FIGS. 10A and 10B and the optoelectronic module of FIG. 1.

FIGS. 10A and 10B are perspective views of another pluggable connector 1000, arranged in accordance with at least one embodiment described herein. FIG. 11A is an exploded perspective view of the pluggable connector 1000 of FIGS. 10A and 10B, arranged in accordance with at least one embodiment described herein. FIG. 12 is an exploded perspective view of the pluggable connector 1000 of FIGS. 10A and 10B and the optoelectronic module 200 of FIG. 1, arranged in accordance with at least one embodiment described herein. In the embodiment of FIGS. 10A and 10B, the pluggable connector 1000 includes a converter to convert an existing ferrule based optical cable 1030 (FIGS. 11 and 12) into a pluggable configuration. As is described more fully below, the assembled pluggable connector 1000 includes a latch release component or tab 1045 and one or more latches 1010 (two latches are illustrated) so as to latch to the optoelectronic module 200.

The ferrule based optical cable 1030 may include a ferrule 1032, a cable jacket 1031, and optical fibers (not shown) housed within the cable jacket 1031. The ferrule 1032 may include a mechanical transfer (MT) ferrule or other suitable ferrule.

FIG. 11A is an exploded view of the pluggable connector 1000 with the ferrule based optical cable 1030 which may be used in association with the optoelectronic module 200. The pluggable connector 1000 includes a connector shell 1020, which includes latches 1010. The connector shell 1020 and latches 1010 may be similar or identical to the connector shell 135 and the latch 125 described above. As described more fully below, the latches 1010 may engage and disengage with the latch slot 220 of the module housing 250. The connector shell 1020 also includes a peninsula-shaped portion or tongue 1015, which transfers an actuating force of the tab 1045 described more fully below so as to cause the latches 1010 to engage and disengage with the latch slot 220 of the module housing 250. The tongue 1015 may be resilient such that it may be deflected up or down, at least within a prescribed range of motion, and return to its initial state without being permanently deformed.

The connector shell 1020 additionally includes a pair of rearward and inward directed tabs 1021 (FIG. 11A) disposed on opposite sides thereof and the ferrule 1032 includes a pair of shoulders 1033 (FIG. 11A) disposed on opposite sides thereof at a back end thereof. When assembled, the ferrule 1032 is positioned inside the connector shell 1020 so that the rearward and inward directed tabs 1021 of the connector shell 1020 are in front of the shoulders 1033 of the ferrule 1032. The rearward and inward directed tabs 1021 engage the shoulders 1033 and prevent the ferrule 1032 from moving forward out of the connector shell 1020.

The connector shell 1020 also includes a clamp slot 1035 formed in each side surface thereof for secure engagement of the connector shell 1020 with an upper clamp 1040 and a lower clamp 1080 of the pluggable connector 1000. The upper clamp 1040 includes the tab 1045, which is used by an operator to apply an actuating force to remove the pluggable connector 1000 and ferrule based optical cable 1030 from the optoelectronic module 200. The upper clamp 1040 includes a rear portion 1044 that includes an arcuate cross member 1043. Similarly, the lower clamp 1080 includes a rear portion 1084 that includes an arcuate cross member 1083. The rear portion 1044 of the upper clamp 1040 and the rear portion 1084 of the lower clamp 1080 are each shaped so that when the upper clamp 1040 and the lower clamp 1080 are assembled together around the ferrule based optical cable 1030 and with the connector shell 1020, the rear portion 1044 and the tab 1045 of the upper clamp 1040 and the rear portion 1084 of the lower clamp 1080 remain external to the connector shell 1020. The rest of each of the upper clamp 1040 and the lower clamp 1080 are received within the connector shell 1020.

Further, the arcuate cross member 1043 of the upper clamp 1040 and the arcuate cross member 1083 of the lower clamp 1080 are each formed so as to correspond and substantially enclose an outer circumference of the cable jacket 1031 of the ferrule based optical cable 1030 when assembled together.

The upper clamp 1040 and the lower clamp 1080 each include two arms 1052 and 1072, respectively, which each include a curved recess 1071 (not shown in the upper clamp 1040), which house springs 1060 of the pluggable connector 1000, so as to spring load the ferrule based optical cable 1030 within the connector shell 1020. In particular, each of the springs 1060 is confined within the curved recess 1071 of one of the arms 1052 of the upper clamp 1040 and the curved recess of a corresponding one of the arms 1072 of the lower clamp 1080.

The upper clamp 1040 and the lower clamp 1080 also each include one or more posts 1070 and one or more recesses 1065, which enable the upper clamp 1040 and the lower clamp 1080 to be securely assembled together. In FIG. 11A, the lower clamp 1080 includes two posts 1070 and two recesses 1065. Although not visible in FIG. 11A, the upper clamp 1040 similarly includes two posts 1070 and two recesses 1065. The two posts 1070 of the upper clamp 1040 are positioned in the upper clamp 1040 to be received in the two recesses 1065 of the lower clamp 1080 when the upper clamp 1040 and the lower clamp 1080 are assembled together. The two recesses 1065 of the upper clamp 1040 are positioned in the upper clamp 1040 to receive the two posts 1070 of the lower clamp 1080 when the upper clamp 1040 and the lower clamp 1080 are assembled together.

The two arms 1052 of the upper clamp 1040 each include clamp latches 1050 and the two arms 1072 of the lower clamp 1080 each include clamp latches 1075. After the upper clamp 1040 and the lower clamp 1080 are assembled together, the two arms 1052 and the two arms 1072 may be inserted into the connector shell 1020. Sides of the connector shell 1020 may exert inward forces on each of the arms 1052 and 1072 and may thereby cause each of the arms 1052 and 1072 to deflect inward at least until the clamp latches 1050 and 1075 reach the clamp slots 1035 of the connector shell

1020. The clamp slots 1035 of the connector shell 1020 may be large enough to substantially or completely accommodate the clamp latches 1050 and 1075. Further, the arms 1052 and 1072 may each be resilient such that when the clamp latches 1050 and 1075 reach the clamp slots 1035, a restoring force in each of the arms 1052 and 1072 may cause the corresponding arm 1052 or 1072 to rebound to, or at least towards, an initial undeflected state at which the corresponding arm 1052 or 1072 exists prior to insertion into the connector shell 1020. In, or at least near, the initial undeflected state, each of the clamp latches 1050 and 1075 may extend into a corresponding one of the clamp slots 1035 to engage the connector shell 1020, thereby securing the upper clamp 1040 and the lower clamp 1080 to the connector shell 1020.

FIG. 12 is an exploded perspective view of the optoelectronic module 200 with the pluggable connector 1000 assembled on the ferrule based optical cable 1030. The assembled pluggable connector 1000 and the ferrule based optical cable 1030 are able to connect and disconnect with the lens assembly 290 of the optoelectronic module 200 in substantially the same manner as the pluggable connector 100 described with respect to FIGS. 1-7.

More specifically, the latches 1010 of the pluggable connector 1000 engage with the latch slot 220/leading wall 602 of the module housing 250 when the pluggable connector 1000 assembled on the ferrule based optical cable 1030 has been inserted into the connector opening 210 in a similar manner as described above. Further, as an operator applies a pressing or actuating force on the tab 1045, a corresponding force is applied to the tongue 1015 of the connector shell 1020, causing the latches 1010 to deflect downward and out of the latch slot 220. With the latches 1010 out of the latch slot 220, they will not interfere with removal of the pluggable connector 1000 from the optoelectronic module 200, enabling the ferrule 1031 of the ferrule based optical cable 1030 to be disengaged from the lens assembly 290 of the optoelectronic module 200 and the ferrule based optical cable 1030 to be removed from the connector opening 210.

As described herein, the pluggable connector 1000 of FIGS. 10A-12 enables an existing optoelectronic module 200 and ferrule based optical cable 1030 to be modified so as to become a pluggable system which provides easy and secure connection and disconnection between the ferrule based optical cable 1030 and the lens assembly 290 of the optoelectronic module 200. This may be advantageous for many reasons, including the ability to perform modular testing of the components of the optoelectronic module 200 and the ferrule based optical cable 1030. Further, the pluggable connector 1000 described herein also allows prefabricated ferrule based optical cables to become pluggable cables and to be reversibly made non-pluggable cables easily, without cutting the cables, and without special tools.

Optionally, the pluggable connector 1000 may include one or more hard stops to prevent the tongue 1015 from being depressed too far and becoming permanently deformed. Such an example will now be described with reference to FIG. 11B. FIG. 11B is a top perspective view of the connector shell 1020 and the upper clamp 1040, arranged in accordance with at least one embodiment described herein. As illustrated in FIG. 11B, the connector shell 1020 defines an opening 1036, which is also labeled in FIG. 11AA. It can be seen from FIGS. 11A and 11B that the tongue 1015 extends into the opening 1036. In a region beneath the tab 1045, the opening 1036 has the width $w_1$ and the tongue 1015 has the width $w_2$ that is less than the width $w_1$ of the opening 1036. The smaller width $w_2$ of the tongue 1015 relative to the width $w_1$ of the opening 1036 allows the tongue 1015 to be depressed relative to the rest of the connector shell 1020.

FIG. 11B additionally illustrates a protrusion 1037 of the tab 1045 of the upper clamp 1040. The protrusion 1037 extends downward by a height h from hard stops 1038 of the tab 1045. The protrusion 1037 is positioned above the tongue 1015 and has the width $w_3$ that is less than the width $w_1$ of the opening 1036. Because the width $w_3$ of the protrusion 1037 is less than the width $w_1$ of the opening 1036, when the tab 1045 is depressed downward, the protrusion 1037 can contact the tongue 1015 and force it downward through the opening 1036 without interference from the rest of the connector shell 1020. The hard stops 1038 extend outward from a location of the tab 1045 above the protrusion 1045. The tab 1045 has the hard stop-to-hard stop width $w_4$ that is greater than the width $w_1$ of the opening 1036.

In response to the tab 1045 being depressed such that a bottom of the protrusion 1037 is depressed into the opening 1036 by the height h such that the tongue 1015 is depressed downward, and because the hard stop-to-hard stop width $w_4$ is greater than the width $w_1$ of the opening 1036, the connector shell 1020 may contact and engage the hard stops 1038 of the tab 1045 and prevent further downward depression of the tab 1045 or the tongue 1015. The hard stops 1038 may thereby prevent downward deflection or depression of the tongue 1015 beyond a predetermined distance determined by the height h of the protrusion 1037, which may prevent the tongue 1015 from being depressed too far and becoming permanently deformed. The predetermined distance the tongue 1015 is permitted to deflect downward may be equal to, substantially equal to, or greater than the height h of the protrusion 1037. The predetermined distance may be selected (by appropriate selection of the height h of the protrusion 1037) to be sufficient for the latch 1010 to be deflected downward and out of the latch slot 220 of the optoelectronic module 200 such that the pluggable connector 1000 and the end of the optical cable 1030 may be removed from the optoelectronic module 200.

Figure 13:
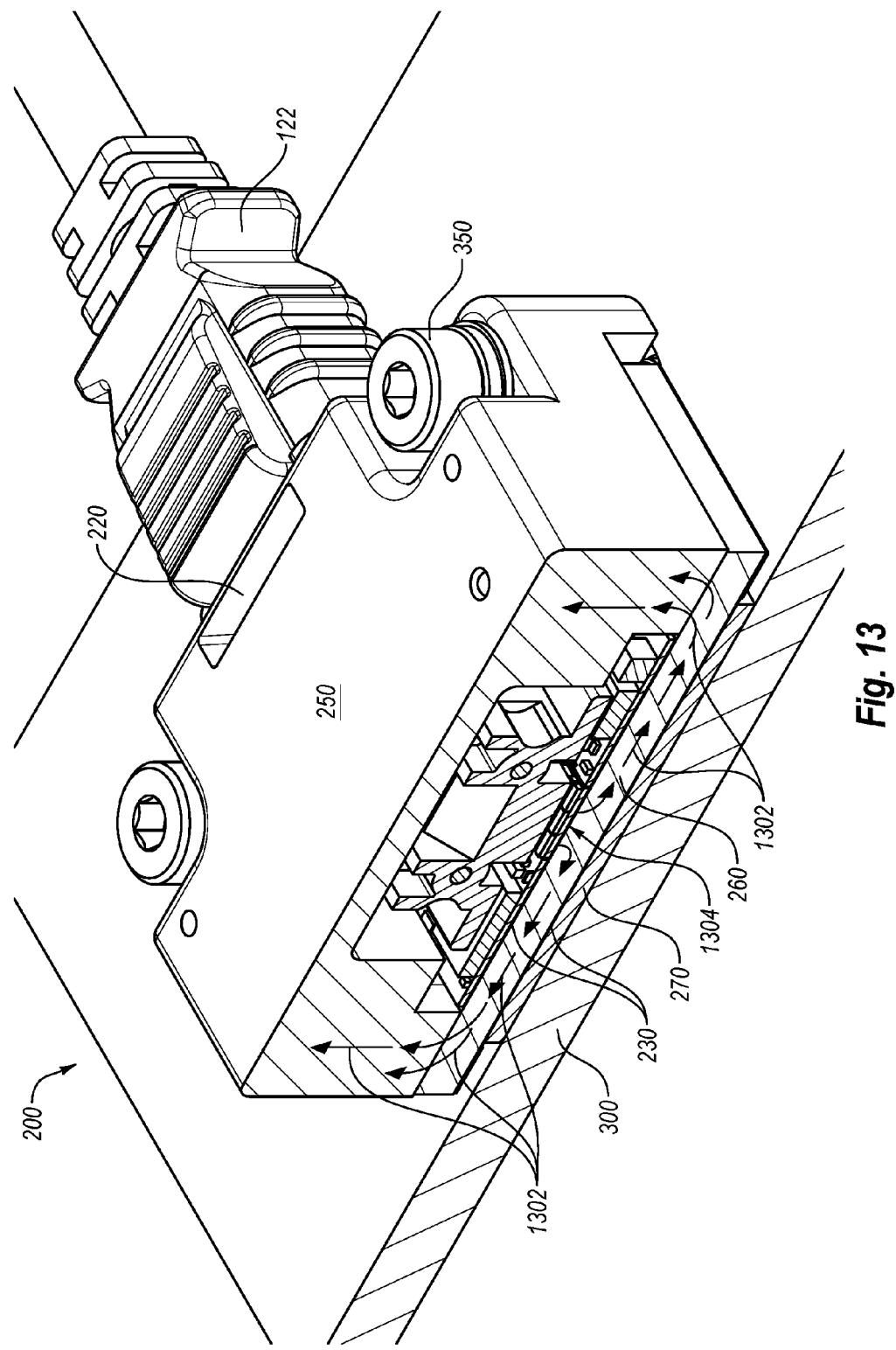
FIG. 13 is a cross-sectional perspective view of the optoelectronic module of FIG. 1 with arrows that denote heat transfer.
Figure 14:
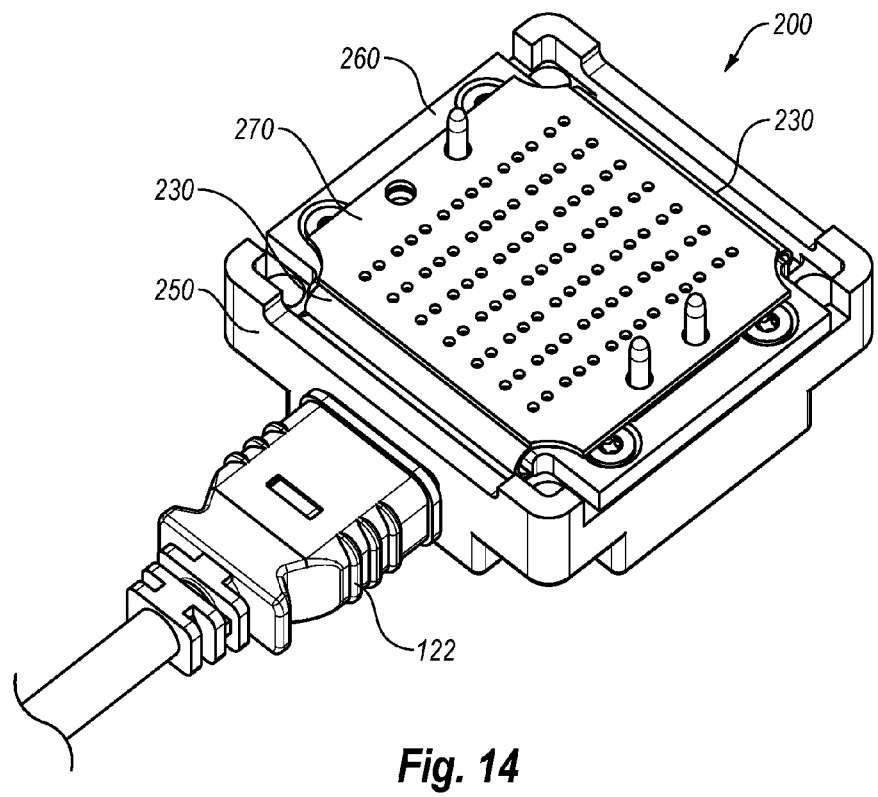
FIG. 14 is a bottom perspective view of the optoelectronic module of FIG. 1.
Figure 15:
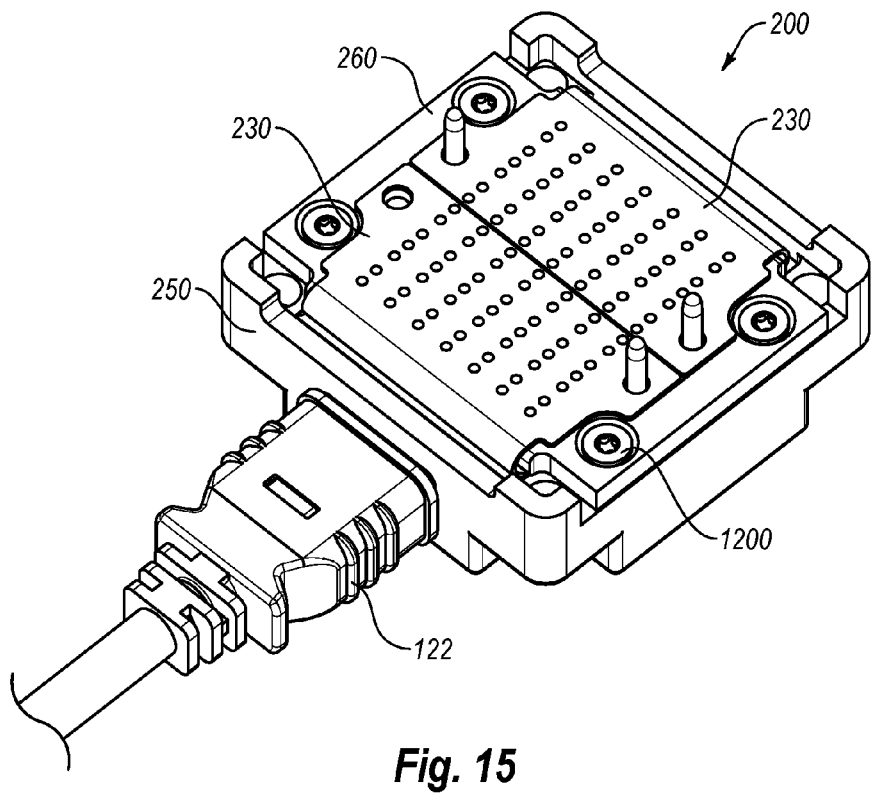
FIG. 15 is another bottom perspective view of the optoelectronic module of FIG. 1.
Figure 16:
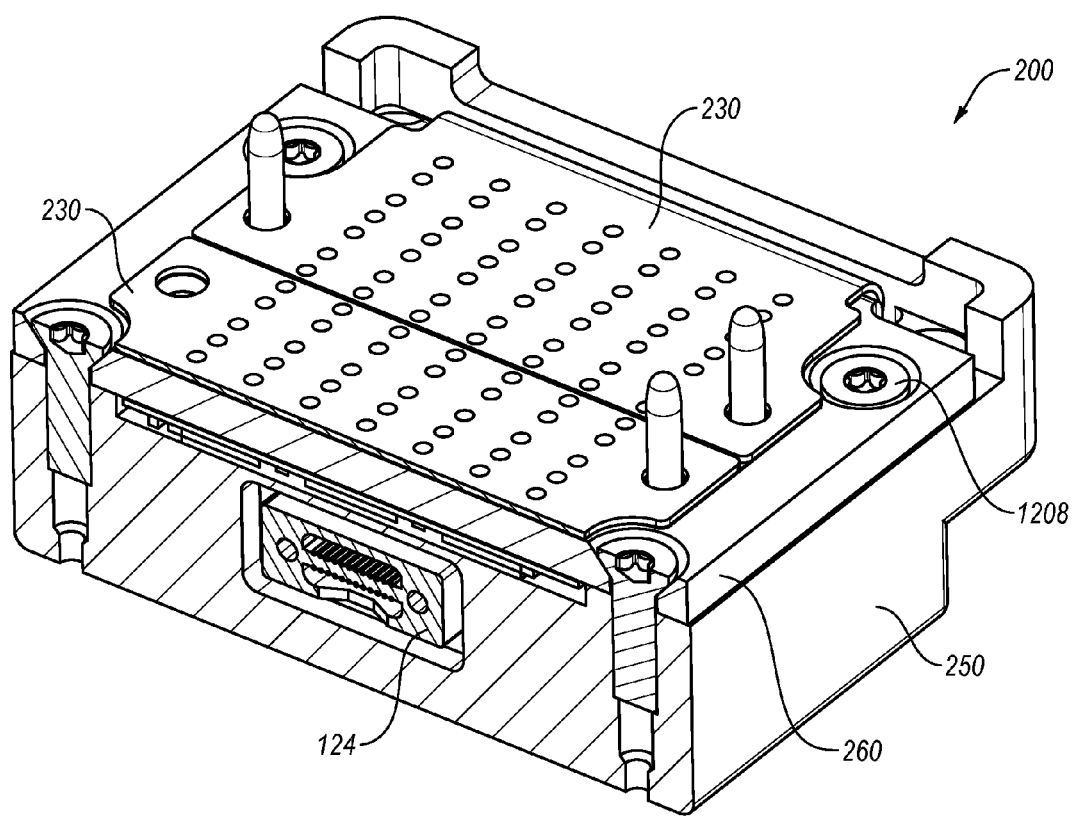
FIG. 16 is a cross-sectional bottom perspective view of the optoelectronic module of FIG. 1, all arranged in accordance with at least one embodiment described herein.

Another aspect of some embodiments will now be described with respect to FIGS. 13-16. FIG. 13 is a cross-sectional perspective view of the optoelectronic module 200 of FIG. 1 with arrows 1302 (only some of which are labeled) that denote heat transfer (hereinafter "heat transfer 1302") through the optoelectronic module 200, arranged in accordance with at least one embodiment described herein. FIG. 14 is a bottom perspective view of the optoelectronic module 200 including the interposer 270 and the flex circuit 230, arranged in accordance with at least one embodiment described herein. FIG. 15 is a bottom perspective view of the optoelectronic module 200 including the flex circuit 230, arranged in accordance with at least one embodiment described herein. FIG. 16 is a cross-sectional bottom perspective view of the optoelectronic module 200, arranged in accordance with at least one embodiment described herein.

With reference to FIG. 13, the optoelectronic module 200 includes the heat spreader 260 housed within the flex circuit 230 and positioned between the interposer 270 and the module housing 250. Various heat-generating components 1304 may be coupled to the flex circuit 230. Some of the heat-generating components 130 may generally be positioned beneath the lens assembly 290. The heat-generating components 1304 may include one or more ICs (e.g., the TIA 605 and/or the laser driver 615 of FIG. 6E) and one or more active optical devices (e.g., the pin array and MPD 610 and/or the VCSEL array 612 of FIG. 6E). The heat transfer 1302 may include conductive transfer of heat from the heat-generating components 1304 to the heat spreader 260, and from the heat spreader 260 into the module housing 250. Although not shown, a heat sink may be coupled to a top surface of the module housing 250. Heat from the module housing 250 may be conductively transferred into the heat sink and may be dissipated from the heat sink through, e.g., convective heat transfer, into a surrounding environment.

In these and other embodiments, each of the heat spreader 260 and the module housing 250 may include a thermally conductive material, such as a thermally conductive metal. For example, each of the heat spreader 260 and the module housing 250 may include aluminum, copper, zinc, alloys of any of the foregoing, or other suitable thermally conductive material(s).

FIG. 14 illustrates the interposer 270 on a bottom of the optoelectronic module 200. The interposer 270 may provide electrical interconnects between the host PCB 300 (FIG. 13) and the flex circuit 230. The interposer 270 has been omitted from FIGS. 15 and 16 to expose a bottom of the flex circuit 230 to view. The cross-sectional view of FIG. 16 illustrates the relative location of the ferrule 124 to other components of the optoelectronic module 200 when inserted into the optoelectronic module 200.

As illustrated in FIGS. 15 and 16, the heat spreader 260 may be mechanically coupled to the module housing 250 by one or more flat head screws 1200, bolts, clips, or other fasteners and/or by epoxy, adhesive, or other fixing means. In some embodiments, the heat spreader 260 may be directly coupled to a bottom of the module housing 250. Alternatively, thermal grease, thermal tape, thermal gel, or other thermally conductive material may be provided between the heat spreader 260 and the module housing 250.

Accordingly, some embodiments described herein include the pluggable connector 100, 800, or 1000 that is configured to removably couple an end of the optical cable 150, 805, or 1030 to the optoelectronic module 200. The pluggable connector may include a first portion configured to engage the latch slot 220 of the optoelectronic module 200 to retain within the optoelectronic module the ferrule 124, 865, or 1032 optically coupled to optical fibers 865 of the optical cable 150, 805, or 1030. The pluggable connector 100, 800, or 1000 may also include a second portion configured to engage the ferrule 124, 865, or 1032 to prevent removal of the ferrule 124, 865, or 1032 from within the optoelectronic module when the first portion engages the latch slot 220.

For example, in any of the embodiments of FIGS. 1-7, the first portion may include the connector shell 135 that includes the resilient tongue 700 with the latch 125 disposed on the resilient tongue 700, the latch 125 configured to be received within the latch slot 220 of the optoelectronic module 200. The connector shell 135 may be configured to receive therein at least a portion of the ferrule 124 at a front of the connector shell 135. The second portion may include the crimp ring base 170 configured to be positioned partially within the connector shell 135 and configured to be positioned behind the ferrule 124. The crimp ring base 170 includes the resilient tab 130 that is configured to be positioned outside of the connector shell 135 above the resilient tongue 700 of the connector shell 135.

In any of the embodiments of FIGS. 1-7, and in response to application of an actuation force of sufficient magnitude to the resilient tab 130 of the crimp ring base 170, various components of the pluggable connector 100 may be configured to react as follows. First, the resilient tab 130 of the crimp ring base 170 may be configured to deflect downward into contact with the resilient tongue 700 of the connector shell 135. Second, the resilient tongue 700 of the connector shell 135 may be configured to deflect downward. Third, the latch 125 disposed on the resilient tongue 700 of the connector shell 135 may be configured to disengage from the latch slot 220 of the optoelectronic module 200 such that the ferrule 124 may be removed from the optoelectronic module 200.

In any of the embodiments of FIGS. 1-7, the pluggable connector 100 may further include the pair of springs 160 configured to be disposed between the crimp ring base 170 and a back of the ferrule 124. The pluggable connector 100 may further include the ferrule boot 155 configured to have the optical fibers 165 pass therethrough, the ferrule boot 155 configured to be disposed partially within the ferrule 124 and partially within the crimp ring base 170. The pluggable connector 100 may further include the crimp ring 175 surrounding the end 180 of the cable jacket 190 of the optical cable 150 at a location at which the neck 171 of the crimp ring base 170 is positioned within the end 180 of the cable jacket 190, the crimp ring 175 being crimped to secure the optical cable 150 to the crimp ring base 170. The pluggable connector 100 may further include the boot 122 positioned behind the crimp ring base 120 and configured to have pass therethrough the optical cable 150.

In any of the embodiments of FIGS. 1-7, the connector shell 135 may define the opening 138 into which the resilient tongue 700 of the connector shell 135 extends. The opening 138 may have the width $w_1$ that is greater than the width $w_2$ of the resilient tongue 700 of the connector shell 135. The resilient tab 130 of the crimp ring base 170 may include the protrusion 139 configured to be positioned above the resilient tongue 700 of the connector shell 135. The protrusion 139 of the resilient tab 130 of the crimp ring base 170 may have the width $w_3$ that is less than the width $w_1$ of the opening 138 defined in the connector shell 135. The resilient tab 130 of the crimp ring base 170 may include hard stops 140 that extend outward from a location above the protrusion 139, the resilient tab 130 of the crimp ring base 170 having the hard stop-to-hard stop width $w_4$ that is greater than the width $w_1$ of the opening 138 defined in the connector shell 135.

In any of the embodiments of FIGS. 1-7, in response to application of an actuation force of sufficient magnitude to the resilient tab 130 of the crimp ring base 170, various components of the pluggable connector 100 may be configured to react as follows. The resilient tab 130 of the crimp ring base 170 may be configured to deflect downward into contact with the resilient tongue 700 of the connector shell 135. The resilient tongue 700 of the crimp ring base 135 may be configured to deflect downward. The connector shell 135 may be configured to engage the hard stops 140 of the resilient tab 130 of the crimp ring base 170 to prevent the resilient tongue 700 of the connector shell 135 from deflecting downward beyond a predetermined distance determined by a distance (or height) h the protrusion 139 extends below the hard stops 140 of the resilient tab 130 of the crimp ring base 170.

As another example, in any of the embodiments of FIGS. 10-12, the first portion may include the connector shell 1020 that includes the resilient tongue 1015 with the latch 1010 disposed on the resilient tongue 1015. The latch 1010 may be configured to be received within the latch slot 220 of the optoelectronic module 200. The connector shell 1020 may be configured to receive therein at least a portion of the ferrule 1032 at a front of the connector shell 1020. The second portion may include the discrete upper and lower clamps 1040 and 1070 that are configured to be assembled together around the optical cable 1030 and to be positioned partially within the connector shell 1020 and behind the ferrule 1032. The upper clamp 1040 includes the resilient tab 1045 that is configured to be positioned outside of the connector shell 1020 above the resilient tongue 1015 of the connector shell 1020.

In any of the embodiments of FIGS. 10A-12, and in response to application of an actuation force of sufficient magnitude to the resilient tab 1045 of the upper clamp 1040, various components of the pluggable connector 1000 may be configured to react as follows. The resilient tab 1045 of the upper clamp 1040 may be configured to deflect downward into contact with the resilient tongue 1015 of the connector shell 1020. The resilient tongue 1015 of the connector shell 1020 may be configured to deflect downward. The latch 1010 disposed on the resilient tongue 1015 of the connector shell 1020 may be configured to disengage from the latch slot 220 of the optoelectronic module 200 such that the ferrule 1032 may be removed from the optoelectronic module 200.

In any of the embodiments of FIGS. 10A-12, the pluggable connector 1000 may further include the pair of springs 1060 configured to be disposed between the assembled upper and lower clamps 1040 and 1070 and a back of the ferrule 1032.

In any of the embodiments of FIGS. 10A-12, the connector shell 1020 may define the opening 1036 into which the resilient tongue 1015 of the connector shell 1020 extends. The opening may have the width $w_1$ that is greater than the width $w_2$ of the resilient tongue 1015 of the connector shell 1020. The resilient tab 1045 of the upper clamp 1040 may include the protrusion 1037 configured to be positioned above the resilient tongue 1015 of the connector shell 1020. The protrusion 1037 of the resilient tab 1045 of the upper clamp 1040 may have the width $w_3$ that is less than the width $w_1$ of the opening 1036 defined in the connector shell 1020. The resilient tab 1045 of the upper clamp 1040 may include the hard stops 1038 that extend outward from a location above the protrusion 1037, the resilient tab 1045 of the upper clamp 1040 having the hard stop-to-hard stop width $w_4$ that is greater than the width $w_1$ of the opening 1036 defined in the connector shell 1020.

In any of the embodiments of FIGS. 10A-12, in response to application of an actuation force of sufficient magnitude to the resilient tab 1045 of the upper clamp 1040, various components of the pluggable connector 1000 may be configured to react as follows. The resilient tab 1045 of the upper clamp 1040 may be configured to deflect downward into contact with the resilient tongue 1015 of the connector shell 1020. The resilient tongue 1015 of the connector shell 1020 is configured to deflect downward. The connector shell 1020 is configured to engage the hard stops 1038 of the resilient tab 1045 of the upper clamp 1040 to prevent the resilient tongue 1015 of the connector shell 1020 from deflecting downward beyond a predetermined distance determined by the distance (or height) h the protrusion 1037 extends below the hard stops 1038 of the resilient tab 1045 of the upper clamp 1040.

As another example, in any of the embodiments of FIGS. 8 and 9, the first portion may include the latching portion 880 of the clip 850. The second portion may include the two lever portions 860 of the clip 850 that extend downward from opposite sides of the latching portion 880.

In any of the embodiments of FIGS. 8 and 9, the clip 850 may be configured to be inserted into the latch slot 220 after the ferrule 865 and the end of the optical cable 805 are positioned within the optoelectronic module 200. Further, after the ferrule 865 and the end of the optical cable 805 are positioned within the optoelectronic module 200 and the clip 850 is fully inserted into the latch slot 220, one or more of the following may exist. The latching portion 880 may remain within the latch slot 220 and the two lever portions 860 may extend downward from the latching portion 880 into the connector opening 210 of the optoelectronic module 200 that receives the ferrule 865 and the end of the optical cable 805. The clip 850 may straddle the optical cable 805 at a location behind the ferrule 865 with one of the two lever portions 860 being positioned in the connector opening 210 to one side of the optical cable 805 and another of the two lever portions 860 being positioned in the connector opening 210 to another side of the optical cable 805. The two lever portions 860 may be positioned in contact with a back of the ferrule 865 to prevent removal of the ferrule 865 and the end of the optical cable 805 from the optoelectronic module 200.

Alternately or additionally, some embodiments described herein include a system that includes the optical cable 150, 805, or 1030 and the pluggable connector 100, 800, or 1000. The optical cable 150, 805, or 1030 may include the cable jacket 190, 870, or 1031 and the optical fibers 165 disposed with in the cable jacket 190, 870, or 1031. The optical fibers 165 may include ends that extend out of the cable jacket 190, 870, or 1031. The pluggable connector 100, 800, or 1000 may be configured to removably couple an end of the optical cable 150, 805, or 1030 to the optoelectronic module 200. The pluggable connector may include a first portion configured to engage the latch slot 220 of the optoelectronic module 200 to retain within the optoelectronic module the ferrule 124, 865, or 1032 optically coupled to the optical fibers 865 of the optical cable 150, 805, or 1030. The pluggable connector 100, 800, or 1000 may also include a second portion that engages the ferrule 124, 865, or 1032 to prevent removal of the ferrule 124, 865, or 1032 from within the optoelectronic module when the first portion engages the latch slot 220.

For example, in any of the embodiments of FIGS. 1-7, the first portion may include the connector shell 135 that includes the resilient tongue 700 with the latch 125 disposed on the resilient tongue 700, the latch 125 configured to be received within the latch slot 220 of the optoelectronic module 200. At least a portion of the ferrule 124 may be received in the connector shell 135 at a front of the connector shell 135. The second portion may include the crimp ring base 170 positioned partially within the connector shell 135 and positioned behind the ferrule 124. The crimp ring base 170 includes the resilient tab 130 that is configured to be positioned outside of the connector shell 135 above the resilient tongue 700 of the connector shell 135.

In any of the embodiments of FIGS. 1-7, the connector shell 135 may define the opening 138 into which the resilient tongue 700 of the connector shell 135 extends. The opening 138 may have the width $w_1$ that is greater than the width $w_2$ of the resilient tongue 700 of the connector shell 135. The resilient tab 130 of the crimp ring base 170 may include the protrusion 139 positioned above the resilient tongue 700 of the connector shell 135. The protrusion 139 of the resilient tab 130 of the crimp ring base 170 may have the width $w_3$ that is less than the width $w_1$ of the opening 138 defined in the connector shell 135. The resilient tab 130 of the crimp ring base 170 may include hard stops 140 that extend outward from a location above the protrusion 139, the resilient tab 130 of the crimp ring base 170 having the hard stop-to-hard stop width $w_4$ that is greater than the width $w_1$ of the opening 138 defined in the connector shell 135.

As another example, in any of the embodiments of FIGS. 10-12, the first portion may include the connector shell 1020 that includes the resilient tongue 1015 with the latch 1010 disposed on the resilient tongue 1015. The latch 1010 may be configured to be received within the latch slot 220 of the optoelectronic module 200. At least a portion of the ferrule 1032 may be received in the connector shell 1020 at a front of the connector shell 1020. The second portion may include the discrete upper and lower clamps 1040 and 1070 assembled together around the optical cable 1030 and positioned partially within the connector shell 1020 and behind the ferrule 1032. The upper clamp 1040 includes the resilient tab 1045 that is positioned outside of the connector shell 1020 above the resilient tongue 1015 of the connector shell 1020.

In any of the embodiments of FIGS. 10A-12, the connector shell 1020 may define the opening 1036 into which the resilient tongue 1015 of the connector shell 1020 extends. The opening may have the width $w_1$ that is greater than the width $w_2$ of the resilient tongue 1015 of the connector shell 1020. The resilient tab 1045 of the upper clamp 1040 may include the protrusion 1037 positioned above the resilient tongue 1015 of the connector shell 1020. The protrusion 1037 of the resilient tab 1045 of the upper clamp 1040 may have the width $w_3$ that is less than the width $w_1$ of the opening 1036 defined in the connector shell 1020. The resilient tab 1045 of the upper clamp 1040 may include the hard stops 1038 that extend outward from a location above the protrusion 1037, the resilient tab 1045 of the upper clamp 1040 having the hard stop-to-hard stop width $w_4$ that is greater than the width $w_1$ of the opening 1036 defined in the connector shell 1020.

As another example, in any of the embodiments of FIGS. 8 and 9, the first portion may include the latching portion 880 of the clip 850. The second portion may include the two lever portions 860 of the clip 850 that extend downward from opposite sides of the latching portion 880.

In any of the embodiments of FIGS. 8 and 9, the clip 850 may be configured to be inserted into the latch slot 220 after the ferrule 865 and the end of the optical cable 805 are positioned within the optoelectronic module 200. Further, after the ferrule 865 and the end of the optical cable 805 are positioned within the optoelectronic module 200 and the clip 850 is fully inserted into the latch slot 220, one or more of the following may exist. The latching portion 880 may remain within the latch slot 220 and the two lever portions 860 may extend downward from the latching portion 880 into the connector opening 210 of the optoelectronic module 200 that receives the ferrule 865 and the end of the optical cable 805. The clip 850 may straddle the optical cable 805 at a location behind the ferrule 865 with one of the two lever portions 860 being positioned in the connector opening 210 to one side of the optical cable 805 and another of the two lever portions 860 being positioned in the connector opening 210 to another side of the optical cable 805. The two lever portions 860 may be positioned in contact with a back of the ferrule 865 to prevent removal of the ferrule 865 and the end of the optical cable 805 from the optoelectronic module 200.

The present invention may be embodied in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A pluggable connector configured to removably couple an end of an optical cable to an optoelectronic module, the pluggable connector comprising:
   a first portion configured to engage a latch slot of the optoelectronic module to retain within the optoelectronic module a ferrule optically coupled to optical fibers of the optical cable, wherein the first portion comprises a connector shell that includes a resilient tongue with a latch disposed on the tongue, the latch configured to be received within the latch slot of the optoelectronic module, wherein the connector shell is configured to receive therein at least a portion of the ferrule at a front of the connector shell; and
   a second portion configured to engage the ferrule to prevent removal of the ferrule from within the optoelectronic module when the first portion engages the latch slot, wherein the second portion comprises a resilient tab that is configured to be positioned outside of the connector shell above the resilient tongue of the connector shell;
   wherein in response to application of an actuation force of sufficient magnitude to the resilient tab of the upper clamp:
      the resilient tab of the second portion is configured to deflect downward into contact with the resilient tongue of the connector shell;
      the resilient tongue of the connector shell is configured to deflect downward; and
      the connector shell is configured to engage the hard stops of the resilient tab of the second portion to prevent the resilient tongue of the connector shell from deflecting downward beyond a predetermined distance determined by a distance the protrusion extends below the hard stops of the resilient tab of the second portion.

2. The pluggable connector of claim 1, wherein:
   the second portion comprises a crimp ring base configured to be positioned partially within the connector shell and configured to be positioned behind the ferrule.

3. The pluggable connector of claim 2, further comprising:
   a pair of springs configured to be disposed between the crimp ring base and a back of the ferrule;
   a ferrule boot configured to have the optical fibers pass therethrough, the ferrule boot configured to be disposed partially within the ferrule and partially within the crimp ring base;
   a crimp ring surrounding an end of a cable jacket of the optical cable at a location at which a neck of the crimp ring base is positioned within the end of the cable jacket, the crimp ring being crimped to secure the optical cable to the crimp ring base; and
   a boot positioned behind the crimp ring base and configured to have pas therethrough the optical cable.

4. The pluggable connector of claim 1, wherein:
   the second portion comprises discrete upper and lower clamps that are configured to be assembled together around the optical cable and to be positioned partially within the connector shell and behind the ferrule.

5. The pluggable connector of claim 4, further comprising a pair of springs configured to be disposed between the assembled upper and lower clamps and a back of the ferrule.

6. The pluggable connector of claim 4, wherein:
   the connector shell defines an opening into which the resilient tongue of the connector shell extends;

the opening has a width that is greater than a width of the resilient tongue of the connector shell;

the resilient tab of the upper clamp includes a protrusion configured to be positioned above the resilient tongue of the connector shell;

the protrusion of the resilient tab of the upper clamp has a width that is less than the width of the opening defined in the connector shell; and the resilient tab of the upper clamp includes hard stops that extend outward from a location above the protrusion, the resilient tab of the upper clamp having a hard stop-to-hard stop width that is greater than the width of the opening defined in the connector shell.

7. A pluggable connector configured to removably couple an end of an optical cable to an optoelectronic module, the pluggable connector comprising:

a connector shell that includes a resilient tongue with a latch disposed on the tongue, the latch configured to be received within the latch slot of the optoelectronic module, wherein the connector shell is configured to receive therein at least a portion of the ferrule at a front of the connector shell; and discrete upper and lower clamps that are configured to be assembled together around the optical cable and to be positioned partially within the connector shell and behind the ferrule, wherein the upper clamp includes a resilient tab that is configured to be positioned outside of the connector shell above the resilient tongue of the connector shell;

wherein in response to application of an actuation force of sufficient magnitude to the resilient tab of the upper clamp:

the resilient tab of the upper clamp is configured to deflect downward into contact with the resilient tongue of the connector shell;

the resilient tongue of the connector shell is configured to deflect downward; and the connector shell is configured to engage hard stops of the resilient tab of the upper clamp to prevent the resilient tongue of the connector shell from deflecting downward beyond a predetermined distance determined by a distance the protrusion extends below the hard stops of the resilient tab of the upper clamp.

8. The pluggable connector of claim 7, further comprising a pair of springs configured to be disposed between the assembled upper and lower clamps and a back of the ferrule.

9. The pluggable connector of claim 7, wherein:

the connector shell defines an opening into which the resilient tongue of the connector shell extends;

the opening has a width that is greater than a width of the resilient tongue of the connector shell;

the resilient tab of the upper clamp includes a protrusion configured to be positioned above the resilient tongue of the connector shell;

the protrusion of the resilient tab of the upper clamp has a width that is less than the width of the opening defined in the connector shell; and the hard stops of the resilient tab extend outward from a location above the protrusion, the resilient tab of the upper clamp having a hard stop-to-hard stop width that is greater than the width of the opening defined in the connector shell.

10. A system comprising:

an optical cable that includes a cable jacket and a plurality of optical fibers disposed within the cable jacket, wherein the plurality of optical fibers include ends that extend out of the cable jacket; and the pluggable connector of claim 7.

11. A pluggable connector configured to removably couple an end of an optical cable to an optoelectronic module, the pluggable connector comprising:

a connector shell that includes a resilient tongue with a latch disposed on the tongue, the latch configured to be received within the latch slot of the optoelectronic module, wherein the connector shell is configured to receive therein at least a portion of a ferrule at a front of the connector shell; and a crimp ring base configured to be positioned partially within the connector shell and configured to be positioned behind the ferrule, wherein the crimp ring base includes a resilient tab that is configured to be positioned outside of the connector shell above the resilient tongue of the connector shell;

wherein, in response to application of an actuation force of sufficient magnitude to the resilient tab of the crimp ring base:

the resilient tab of the crimp ring base is configured to deflect downward into contact with the resilient tongue of the connector shell;

the resilient tongue of the connector shell is configured to deflect downward; and the latch disposed on the resilient tongue of the connector shell is configured to disengage from the latch slot of the optoelectronic module such that the ferrule may be removed from the optoelectronic module.

12. The pluggable connector of claim 11, further comprising:

a pair of springs configured to be disposed between the crimp ring base and a back of the ferrule;

a ferrule boot configured to have the optical fibers pass therethrough, the ferrule boot configured to be disposed partially within the ferrule and partially within the crimp ring base;

a crimp ring surrounding an end of a cable jacket of the optical cable at a location at which a neck of the crimp ring base is positioned within the end of the cable jacket, the crimp ring being crimped to secure the optical cable to the crimp ring base; and a boot positioned behind the crimp ring base and configured to have pass therethrough the optical cable.

13. The pluggable connector of claim 11, wherein:

the connector shell defines an opening into which the resilient tongue of the connector shell extends;

the opening has a width that is greater than a width of the resilient tongue of the connector shell;

the resilient tab of the crimp ring base includes a protrusion configured to be positioned above the resilient tongue of the connector shell;

the protrusion of the resilient tab of the crimp ring base has a width that is less than the width of the opening defined in the connector shell; and the resilient tab of the crimp ring base includes hard stops that extend outward from a location above the protrusion, the resilient tab of the crimp ring base having a hard stop-to-hard stop width that is greater than the width of the opening defined in the connector shell.

14. A system comprising:

an optical cable that includes a cable jacket and a plurality of optical fibers disposed within the cable jacket, wherein the plurality of optical fibers include ends that extend out of the cable jacket; and the pluggable connector of claim 11.

* * * * *